US011732330B2

(12) United States Patent
Hasnine et al.

(10) Patent No.: US 11,732,330 B2
(45) Date of Patent: Aug. 22, 2023

(54) HIGH RELIABILITY LEAD-FREE SOLDER ALLOY FOR ELECTRONIC APPLICATIONS IN EXTREME ENVIRONMENTS

(71) Applicant: ALPHA ASSEMBLY SOLUTIONS INC., Waterbury, CT (US)

(72) Inventors: Md Hasnine, Glenview, IL (US); Lik Wai Kho, Glenview, IL (US)

(73) Assignee: Alpha Assembly Solutions, Inc., Waterbury, CT (US)

( * ) Notice: Subject to any disclaimer, the term of this patent is extended or adjusted under 35 U.S.C. 154(b) by 267 days.

(21) Appl. No.: 16/022,345

(22) Filed: Jun. 28, 2018

(65) Prior Publication Data

US 2019/0136347 A1  May 9, 2019

Related U.S. Application Data

(60) Provisional application No. 62/583,939, filed on Nov. 9, 2017.

(51) Int. Cl.
*C22C 13/00* (2006.01)
*B23K 35/26* (2006.01)
*C22C 13/02* (2006.01)
*B23K 35/02* (2006.01)

(52) U.S. Cl.
CPC ............ *C22C 13/00* (2013.01); *B23K 35/262* (2013.01); *C22C 13/02* (2013.01); *B23K 35/025* (2013.01); *B23K 35/0227* (2013.01); *B23K 35/0244* (2013.01)

(58) Field of Classification Search
CPC ....... C22C 13/00; C22C 13/02; B23K 35/262; B23K 35/0227; B23K 35/0244; B23K 35/025
USPC .................................................. 420/561, 560
See application file for complete search history.

(56) References Cited

U.S. PATENT DOCUMENTS

| 6,176,947 | B1 | 1/2001 | Hwang et al. |
| 2002/0117539 | A1 | 8/2002 | Ito et al. |
| 2009/0232696 | A1 | 9/2009 | Ohnishi et al. |
| 2010/0297470 | A1 | 11/2010 | Munekata et al. |
| 2012/0223430 | A1 | 9/2012 | Terashima et al. |
| 2014/0054766 | A1 | 2/2014 | Hashino et al. |
| 2014/0141273 | A1 | 5/2014 | Shimamura et al. |
| 2015/0221606 | A1 | 8/2015 | Yamanaka et al. |
| 2015/0224604 | A1* | 8/2015 | Choudhury .......... B23K 1/0056 403/272 |
| 2016/0056570 | A1 | 2/2016 | Yoshikawa et al. |
| 2016/0279741 | A1 | 9/2016 | Ukyo et al. |
| 2017/0066089 | A1 | 3/2017 | Maalekian et al. |
| 2017/0355043 | A1 | 12/2017 | Ikeda et al. |
| 2018/0029169 | A1 | 2/2018 | Arai et al. |
| 2018/0102464 | A1 | 4/2018 | de Avila Ribas et al. |
| 2018/0214989 | A1 | 8/2018 | Ikeda et al. |

FOREIGN PATENT DOCUMENTS

| CN | 1785579 A | 6/2006 |
| JP | 2011-251310 A | 12/2011 |
| JP | 2015-020182 A1 | 2/2015 |
| JP | 5722302 B2 | 5/2015 |
| JP | 2016019992 A * | 2/2016 |
| WO | 2014057261 A1 | 4/2014 |
| WO | WO-2017192517 A1 * | 11/2017 ............... B23K 1/00 |

OTHER PUBLICATIONS

Translation JP-2016019992-A (Year: 2016).*
International Search Report, PCT/US2018/058477, dated Jan. 25, 2019, 4 pages.
Written Opinion, PCT/US2018/058477, dated Jan. 25, 2019, 8 pages.
International Preliminary Report of Patentability PCT/US2018/058477, dated May 12, 2020 10 pages.

* cited by examiner

*Primary Examiner* — Brian D Walck
*Assistant Examiner* — Danielle M. Carda
(74) *Attorney, Agent, or Firm* — Stinson LLP

(57) ABSTRACT

A lead-free solder alloy may comprise tin, silver, copper, bismuth, cobalt, titanium, and antimony. The alloy may further comprise antimony, nickel, or both. The silver may be present in an amount from about 3.1% to 3.8% by weight of the solder. The copper may be present in an amount from about 0.5% to 0.8% by weight of the solder. The bismuth may be present in an amount from about 0.0% (or 1.5%) to about 3.2% by weight of the solder. The cobalt may be present in an amount from about 0.03% to about 1.0% (or 0.05%) by weight of the solder. The titanium may be present in an amount from about 0.005% to about 0.02% by weight of the solder. The antimony may be present in an amount between about 1.0% to about 3.0% by weight of the solder. The balance of the solder is tin.

11 Claims, 25 Drawing Sheets

HIGH RELIABILITY LEAD-FREE SOLDER ALLOY FOR ELECTRONIC APPLICATIONS IN EXTREME ENVIRONMENTS

CROSS REFERENCE TO RELATED APPLICATIONS

The present application claims the benefit of U.S. Provisional Patent Application No. 62/583,939, filed Nov. 9, 2017, the entire contents of which are incorporated herein by reference.

FIELD

The present disclosure generally relates to lead-free solder alloys for electronic applications.

BACKGROUND

Solder alloys are widely used for manufacturing and assembly a variety of electronic devices. Traditionally, solder alloys have been tin-lead based alloys. Tin-lead based alloys were used to prepare solder with desired materials properties, including a suitable melting point and pasty range, wetting properties, ductility, and thermal conductivities. However, lead is a highly toxic, environmentally hazardous material that can cause a wide range of harmful effects. As a result, research has focused on producing lead-free solder alloys with desired materials properties.

The present disclosure relates to a high reliability lead-free solder alloy providing a lower undercooling temperature, improved thermo-mechanical reliability, and high temperature creep resistance in extreme hot and cold weather as compared to certain prior art alloys.

SUMMARY

According to one aspect of the present disclosure, a lead-free alloy comprises: 3.1 to 3.8 wt. % silver, 0.5 to 0.8 wt. % copper; 0.0 to 3.2 wt. % bismuth; 0.03 to 1.0 wt. % cobalt; 0.005 to 0.02 wt. % titanium; and balance tin, together with any unavoidable impurities. Optionally, the alloy may further comprise 0.01 to 0.1 wt. % nickel.

According to another aspect of the present disclosure, a lead-free alloy comprises: 3.8 wt. % silver, 0.7 wt. % copper; 1.5 wt. % bismuth; 0.05 wt. % cobalt; 0.008 wt. % titanium; and balance tin, together with any unavoidable impurities. Optionally, the alloy may further comprise 0.05 wt. % nickel.

According to another aspect of the present disclosure, a lead-free alloy comprises: 3.1 to 3.8 wt. % silver, 0.5 to 0.8 wt. % copper; 0.0 to 3.2 wt. % bismuth; 0.05 to 1.0 wt. % cobalt; 1.0 to 3.0 wt. % antimony; 0.005 to 0.02 wt. % titanium; and balance tin, together with any unavoidable impurities. Optionally, the alloy may further comprise 0.01 to 0.1 wt. % nickel.

According to another aspect of the present disclosure, a lead-free alloy comprises: 3.8 wt. % silver, 0.8 wt. % copper; 1.5 wt. % bismuth; 0.05 wt. % cobalt; 1.0 wt. % antimony; 0.008 wt. % titanium; and balance tin, together with any unavoidable impurities. Optionally, the alloy may further comprise 0.05 wt. % nickel.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

Figure 1B:
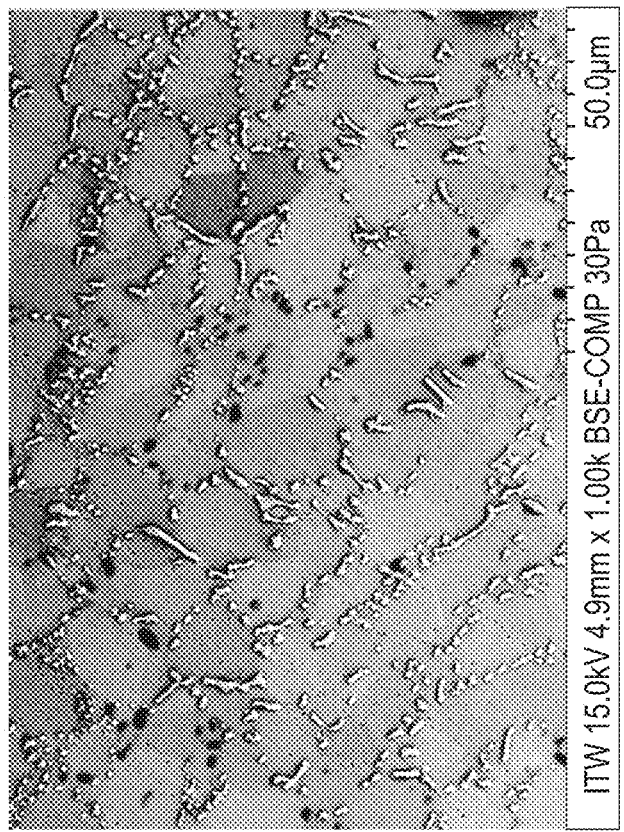
FIG. 1B is a SEM micrograph of a prior art SAC305 alloy that has been aged at 125 degree Celsius for 24 hours.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

Novel lead-free solder alloy compositions that are suitable for a variety of electronics applications, particularly in extreme environments, are described below. These solder alloy compositions may be used in various forms. For example, the solder alloy compositions may be used in the form of a bar, wire, solder powder, solder paste, or another predetermined preform. These solder alloy compositions are tin based, in particular tin-silver-copper (sometimes referred to as "SAC") based.

With the onset of the Internet of Things (IoT), electronic devices are finding applications in more and more challenging operating environments, leading to higher power densities. As a result, there is an urgent need in the electronic assembly industry for solder that can operate at higher temperatures. The operating temperature of power electronic applications such as automobiles, trains, aerospace, oil drills, downhole gas exploration, and power stations often varies between 100° C. and 200° C. Solder joints exposed to elevated temperatures for longer times often lose their mechanical strength and structural integrity.

The addition of a small amount of cobalt to tin-silver-copper solder significantly reduces the undercooling temperature and reduces the formation of large $Ag_3Sn$ platelets (the formation of which could otherwise lead to poor mechanical performance). Further, the synergistic effect of adding cobalt and titanium results in a refined, uniform, and stable microstructure. Such a microstructure may significantly enhance the fatigue life of solder joints. As additives to a tin-silver-copper alloy, both bismuth and antimony dissolve in tin matrix and act as solid solution strengthening agents, which improves the mechanical properties and thermo-mechanical reliability of the solder, particularly in harsh environments.

The compositions shown in Tables 1 to 5 have been found to exhibit desirable properties that are superior to certain prior art alloys. For example, the lead-free solder compositions described in Tables 1 to 5 provide lower undercooling temperature, reasonable wetting and spreading performance, improved thermo-mechanical reliability, and high temperature creep resistance in extreme hot and cold weather as compared to certain prior art alloys.

Table 1 provides several compositions according to the present disclosure that comprise tin, silver, copper, bismuth, cobalt, and titanium. Optionally, these compositions may additionally comprise nickel.

TABLE 1

| Element | Composition Range 1.1 (wt. %) | Composition Range 1.2 (wt. %) | Composition Range 1.3 (wt. %) | Composition Range 1.4 (wt. %) | Composition Range 1.5 (wt. %) |
| --- | --- | --- | --- | --- | --- |
| Silver (Ag) | 2.0-5.0 | 3.1-3.8 | 3.1-3.8 | 3.1-3.8 | 3.1-3.8 |
| Copper (Cu) | 0.2-1.2 | 0.5-0.9 | 0.5-0.8 | 0.5-0.9 | 0.5-0.8 |
| Bismuth (Bi) | 0.0-5.0 | 0.0-3.2 | 1.5-3.8 | 0.0-3.2 | 1.5-3.8 |
| Cobalt (Co) | 0.0-1.0 | 0.01-0.2 | 0.03-0.05 | 0.03-0.2 | 0.03-0.05 |
| Titanium (Ti) | 0.0-0.02 | 0.005-0.02 | 0.005-0.008 | 0.005-0.02 | 0.005-0.008 |
| Nickel (Ni) | | | | 0.01-0.1 | 0.01-0.1 |
| Tin (Sn) | Balance | Balance | Balance | Balance | Balance |

Table 2 provides several more compositions according to the present disclosure, shown as specific examples.

TABLE 2

| Element | Example 2.1 (wt. %) | Example 2.2 (wt. %) | Example 2.3 (wt. %) | Example 2.4 (wt. %) | Example 2.5 (wt. %) |
| --- | --- | --- | --- | --- | --- |
| Silver (Ag) | 3.8 | 3.8 | 3.8 | 3.8 | 3.8 |
| Copper (Cu) | 0.8 | 0.8 | 0.8 | 0.8 | 0.8 |
| Bismuth (Bi) | 1.5 | 1.5 | 1.5 | 3.0 | 3.0 |

TABLE 2-continued

| Element | Example 2.1 (wt. %) | Example 2.2 (wt. %) | Example 2.3 (wt. %) | Example 2.4 (wt. %) | Example 2.5 (wt. %) |
|---|---|---|---|---|---|
| Cobalt (Co) | | 0.03 | 0.05 | | 0.05 |
| Titanium (Ti) | | 0.008 | 0.008 | | 0.008 |
| Tin (Sn) | Balance | Balance | Balance | Balance | Balance |

Table 3 provides several compositions according to the present disclosure that comprise tin, silver, copper, bismuth, cobalt, titanium, and antimony. Optionally, these compositions may additionally comprise nickel.

TABLE 3

| Element | Composition Range 3.1 (wt. %) | Composition Range 3.2 (wt. %) | Composition Range 3.3 (wt. %) | Composition Range 3.4 (wt. %) | Composition Range 3.5 (wt. %) |
|---|---|---|---|---|---|
| Silver (Ag) | 2.0-5.0 | 3.1-3.8 | 3.1-3.8 | 3.1-3.8 | 3.1-3.8 |
| Copper (Cu) | 0.2-1.2 | 0.5-0.9 | 0.5-0.8 | 0.5-0.9 | 0.5-0.8 |
| Bismuth (Bi) | 0.0-5.0 | 0.0-3.2 | 1.5-3.8 | 0.0-3.2 | 1.5-3.8 |
| Cobalt (Co) | 0.001-1.0 | 0.03-0.2 | 0.03-0.05 | 0.03-0.2 | 0.03-0.05 |
| Titanium (Ti) | 0.005-0.02 | 0.005-0.02 | 0.005-0.008 | 0.005-0.02 | 0.005-0.008 |
| Antimony (Sb) | 0.0-5.0 | 1.0-3.0 | 1.0-3.0 | 1.0-3.0 | 1.0-3.0 |
| Nickel (Ni) | | | | 0.01-0.1 | 0.01-0.1 |
| Tin (Sn) | Balance | Balance | Balance | Balance | Balance |

Table 4 provides several more compositions according to the present disclosure, shown as specific examples.

TABLE 4

| Element | Example 4.1 (wt. %) | Example 4.2 (wt. %) | Example 4.3 (wt. %) | Example 4.4 (wt. %) | Example 4.5 (wt. %) | Example 4.6 (wt. %) |
|---|---|---|---|---|---|---|
| Silver (Ag) | 3.8 | 3.8 | 3.8 | 3.8 | 3.8 | 3.2 |
| Copper (Cu) | 0.8 | 0.8 | 0.8 | 0.8 | 0.8 | 0.8 |
| Bismuth (Bi) | 1.5 | 1.5 | 1.5 | 3.0 | 3.0 | 3.0 |
| Cobalt (Co) | | 0.03 | 0.05 | | 0.05 | 0.05 |
| Titanium (Ti) | | 0.008 | 0.008 | | 0.008 | 0.008 |
| Antimony (Sb) | 1.0 | 1.0 | 1.0 | 1.5 | 1.5 | 3.0 |
| Tin (Sn) | Balance | Balance | Balance | Balance | Balance | Balance |

Table 5 provides several more compositions according to the present disclosure, shown as specific examples.

TABLE 5

| Element | Example 5.1 (wt. %) | Example 5.2 (wt. %) | Example 5.3 (wt. %) | Example 5.4 (wt. %) | Example 5.5 (wt. %) |
|---|---|---|---|---|---|
| Silver (Ag) | 3.8 | 3.8 | 3.8 | 3.8 | 3.8 |
| Copper (Cu) | 0.7 | 0.7 | 0.8 | 0.8 | 0.8 |
| Bismuth (Bi) | 1.5 | 1.5 | 1.5 | 3.0 | 3.0 |
| Cobalt (Co) | | 0.03 | 0.05 | | 0.05 |
| Titanium (Ti) | | 0.008 | 0.008 | | 0.008 |
| Antimony (Sb) | | | 1.0 | 1.0 | 1.5 |
| Nickel (Ni) | 0.05 | 0.05 | 0.05 | 0.05 | 0.05 |
| Tin (Sn) | Balance | Balance | Balance | Balance | Balance |

Controlled additions of bismuth (Bi), antimony (Sb), cobalt (Co), and/or titanium (Ti) to a tin-silver-copper (Sn—Ag—Cu) system are used to refine the alloy's grain structure and increase the alloy's mechanical strength. More specifically, cobalt may be added to the alloy to refine the grain structure and reduce the undercooling temperature. Further, the synergistic effect of adding cobalt and titanium leads to a refined, uniform, and stable microstructure. Such microstructure significantly enhances the fatigue life of solder joints. As additives to a tin-silver-copper system, bismuth and antimony both dissolve in tin and may be added to the alloy to provide solid solution strengthening and thus improve the alloy's mechanical properties and any resulting solder joint's thermal cyclic reliability, particularly in harsh environments. Also, bismuth decreases the solidus temperature of the alloy and reduces its surface tension, thus improving the wettability. Antimony increases the mechanical strength of the alloy. Optionally, nickel may be added to improve further the mechanical properties of the alloy. In addition, elements such as germanium or phosphorus may be added to improve the alloy's oxidation resistance. The proper synergy between the mechanisms described above, which is achieved though the specific composition ranges claimed in the instant application, optimizes the alloy's mechanical properties and any resulting solder joints' resistance to thermal cycles, particularly in harsh environments.

The disclosed composition ranges have been found to exhibit excellent thermal fatigue and creep resistance superior to certain prior art alloys. The high reliability lead-free solder compositions described here provide a significant reduction of undercooling temperature, reasonable wetting and spreading performance, improved thermo-mechanical reliability, and high temperature creep resistance in extreme hot and cold weather. The disclosed solder compositions have been found to exhibit significantly reduced undercooling temperature, and improved thermo-mechanical reliability and creep resistance. Large $Ag_3Sn$ platelets are prevented from forming. The disclosed solder compositions are suitable for electronics applications in high temperature or harsh environments, including but not limited to applications in automobiles, trains, aerospace, oil drills, downhole gas exploration, and power stations.

Figure 1A:
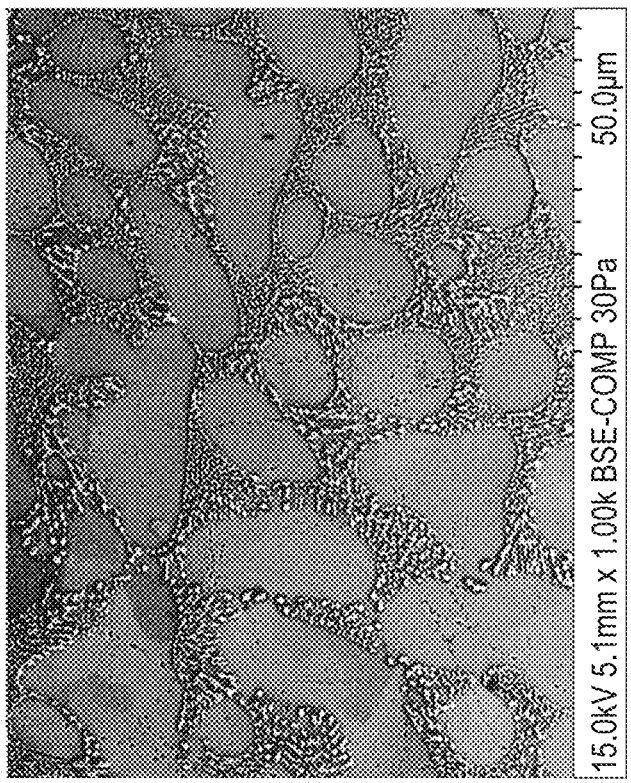
FIG. 1A is a SEM micrograph of a prior art SAC305 alloy in as cast condition.
Figure 2A:
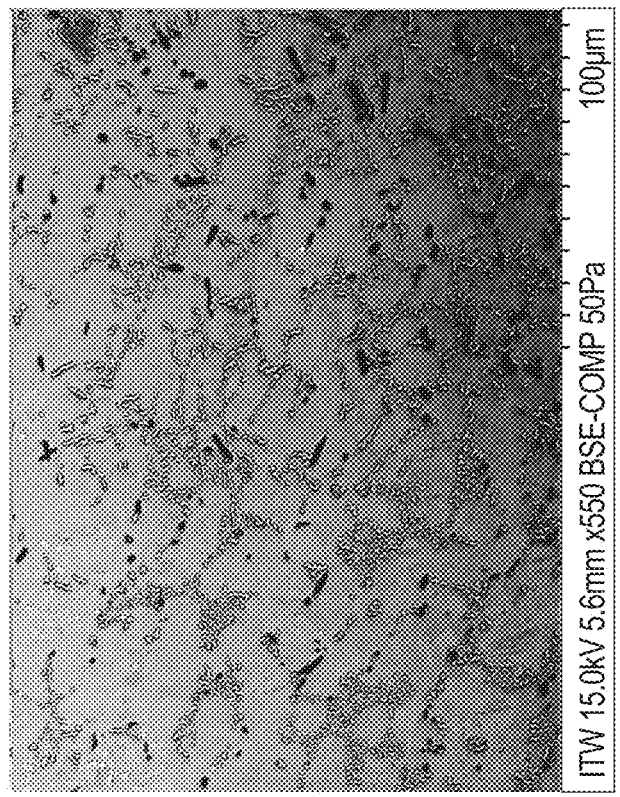
FIG. 2A is a SEM micrograph of an alloy according to the present disclosure in as cast condition.
Figure 2B:
FIG. 2B is a SEM micrograph of an alloy according to the present disclosure that has been aged at 125 degree Celsius for 24 hours.

FIGS. 1A and 1B show scanning electron microscope ("SEM") micrographs of areas of the surface of a prior art alloy comprising 96.5 wt. % tin, 3.0% silver, and 0.5 wt. % copper ("SAC305"). FIGS. 2A and 2B show SEM micrographs of areas of the surface of an alloy according to the composition of Example 4.5 shown in Table 4. FIGS. 1A and 2A show the alloys as cast; whereas FIGS. 1B and 2B show the alloys after aging for 24 hours at a temperature of 125° C. As can be seen from the SEM micrographs, the grain structure of the SAC305 alloy (shown in FIGS. 1A and 1B) coarsens during aging at an elevated temperature. In contrast, the Example 4.5 alloy maintains its finer, more uniform grain structure during aging at 125° C. (compare FIG. 2A to FIG. 2B). The microstructure contains $Ag_3Sn$ and $Cu_6Sn_5$ precipitates, and bismuth and antimony each dissolve in the tin matrix, which provides solid solution strengthening. Cobalt and titanium act as micro-alloying elements to refine the microstructure. The finely distributed $Ag_3Sn$ and $Cu_6Sn_5$ precipitates and solid solution strengthening stabilize the microstructure during aging at an elevated temperature, particularly in harsh environments.

TABLE 6

| Alloy | Alloy Composition | Onset of Heating, $T_1$ °C. | Onset of Cooling, $T_2$ °C. | Undercooling ($\Delta T = T_1 - T_2$) | Pasty Range, °C. |
|---|---|---|---|---|---|
| Prior Art SAC305 Alloy | Sn—0.5Cu—3Ag | 217 | 197 | 20 | 4 |
| Example 4.1 | Sn—0.8Cu—3.8Ag—1.5Bi—1.0Sb | 217.16 | 219.85 | 12.32 | 2.4 |
| Example 4.2 | Sn—0.8Cu—3.8Ag—1.5Bi—1.0Sb—0.03Co—0.008Ti | 217.46 | 208.68 | 10.31 | 3.62 |
| Example 4.3 | Sn—0.8Cu—3.8Ag—1.5Bi—1.0Sb—0.05Co—0.008Ti | 217.56 | 213.04 | 4.52 | 3.28 |
| Example 4.4 | Sn—0.8Cu—3.8Ag—3Bi—1.5Sb | 213.73 | 197.65 | 16.08 | 5.92 |
| Example 4.5 | Sn—0.8Cu—3.8Ag—3Bi—1.5Sb—0.05Co—0.008Ti | 213.96 | 206.47 | 7.49 | 6.55 |
| Example 4.6 | Sn—0.8Cu—3.2Ag—3Bi—3Sb—0.05Co—0.008Ti | 215.18 | 223.51 | 8.35 | 5.67 |

Figure 3:
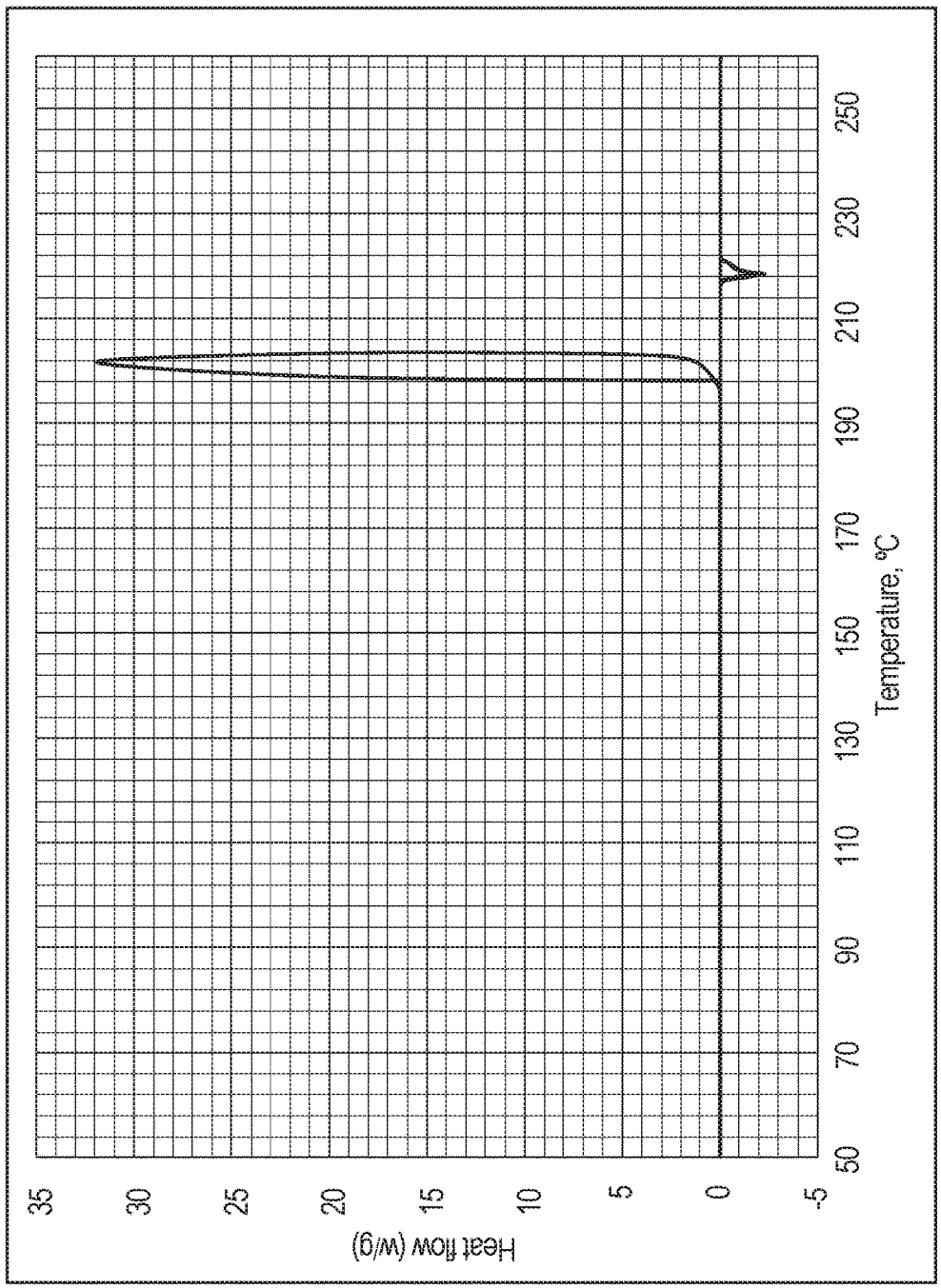
FIG. 3 is a differential scanning calorimetry (DSC) chart for a prior art SAC305 alloy.
Figure 4:
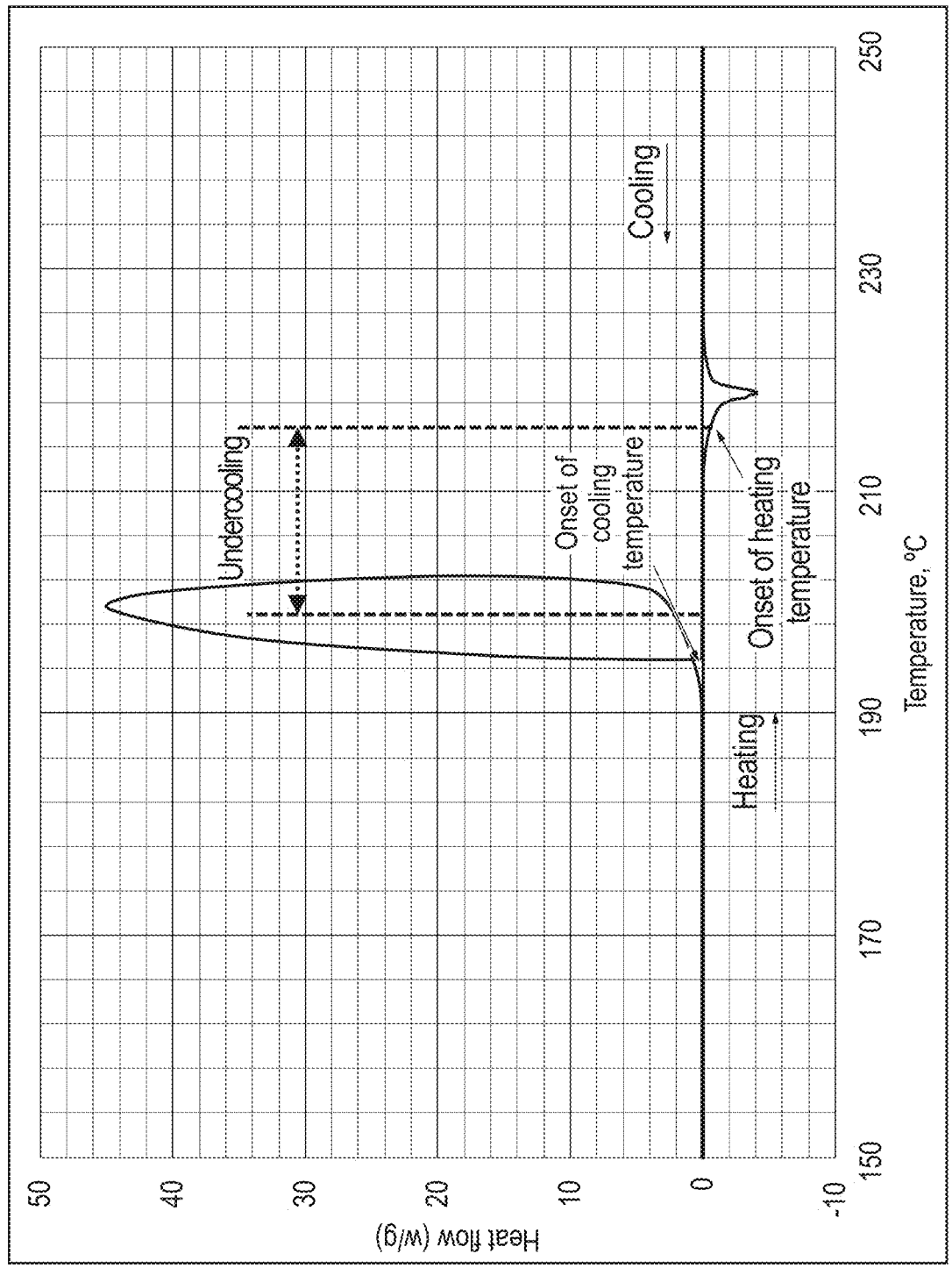
FIG. 4 is a differential scanning calorimetry (DSC) chart for an alloy according to the present disclosure.
Figure 5:
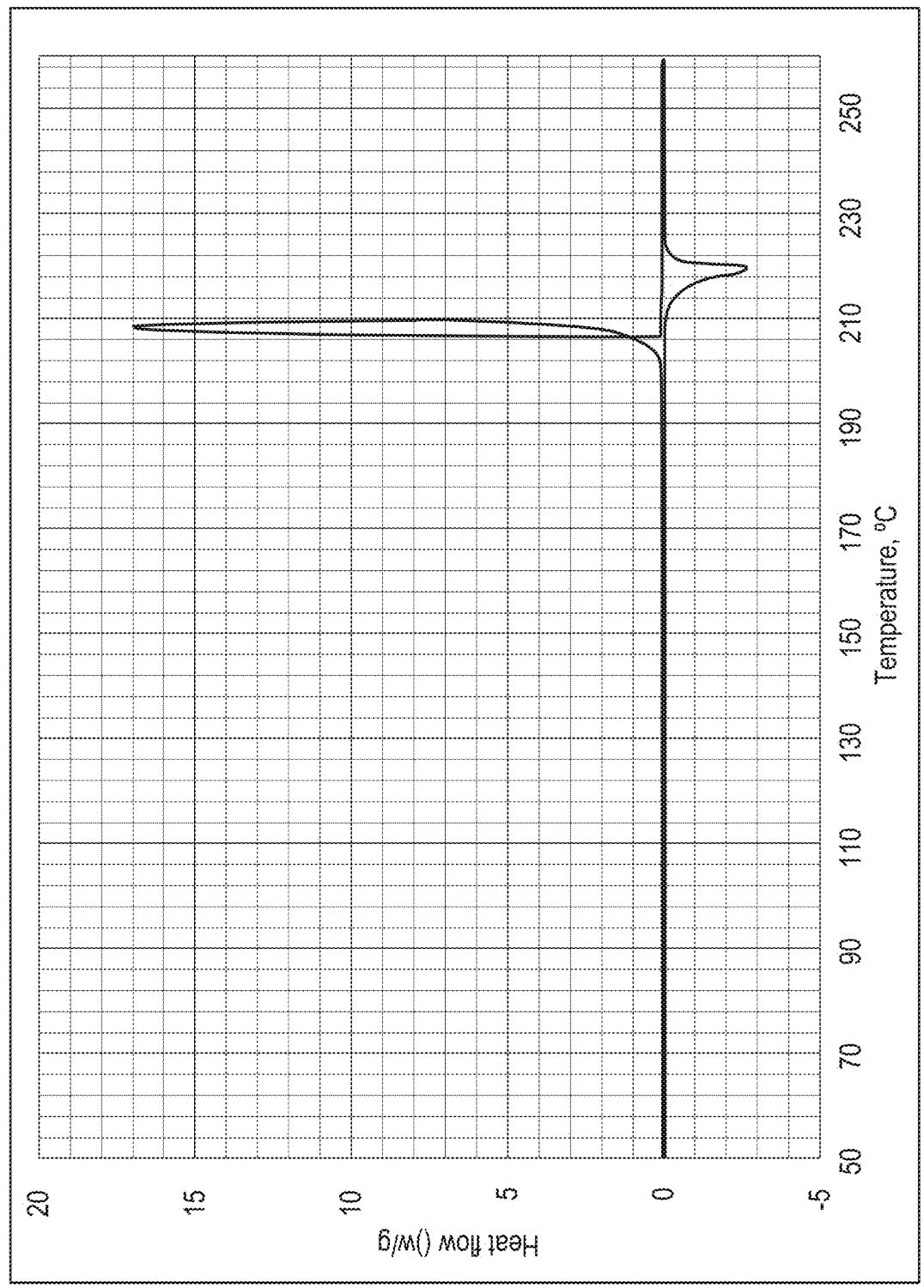
FIG. 5 is a differential scanning calorimetry (DSC) chart for an alloy according to the present disclosure.
Figure 6:
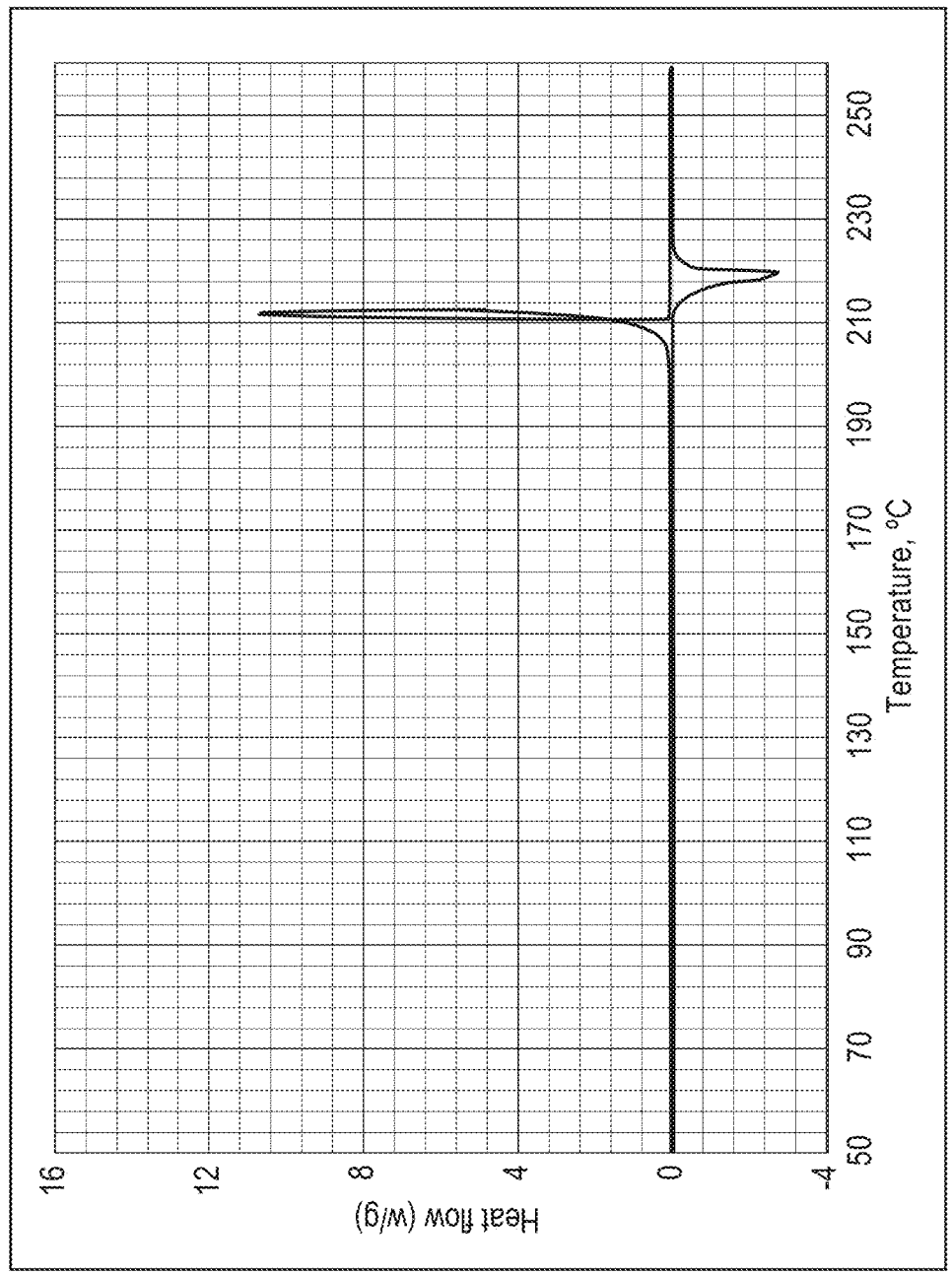
FIG. 6 is a differential scanning calorimetry (DSC) chart for an alloy according to the present disclosure.
Figure 7:
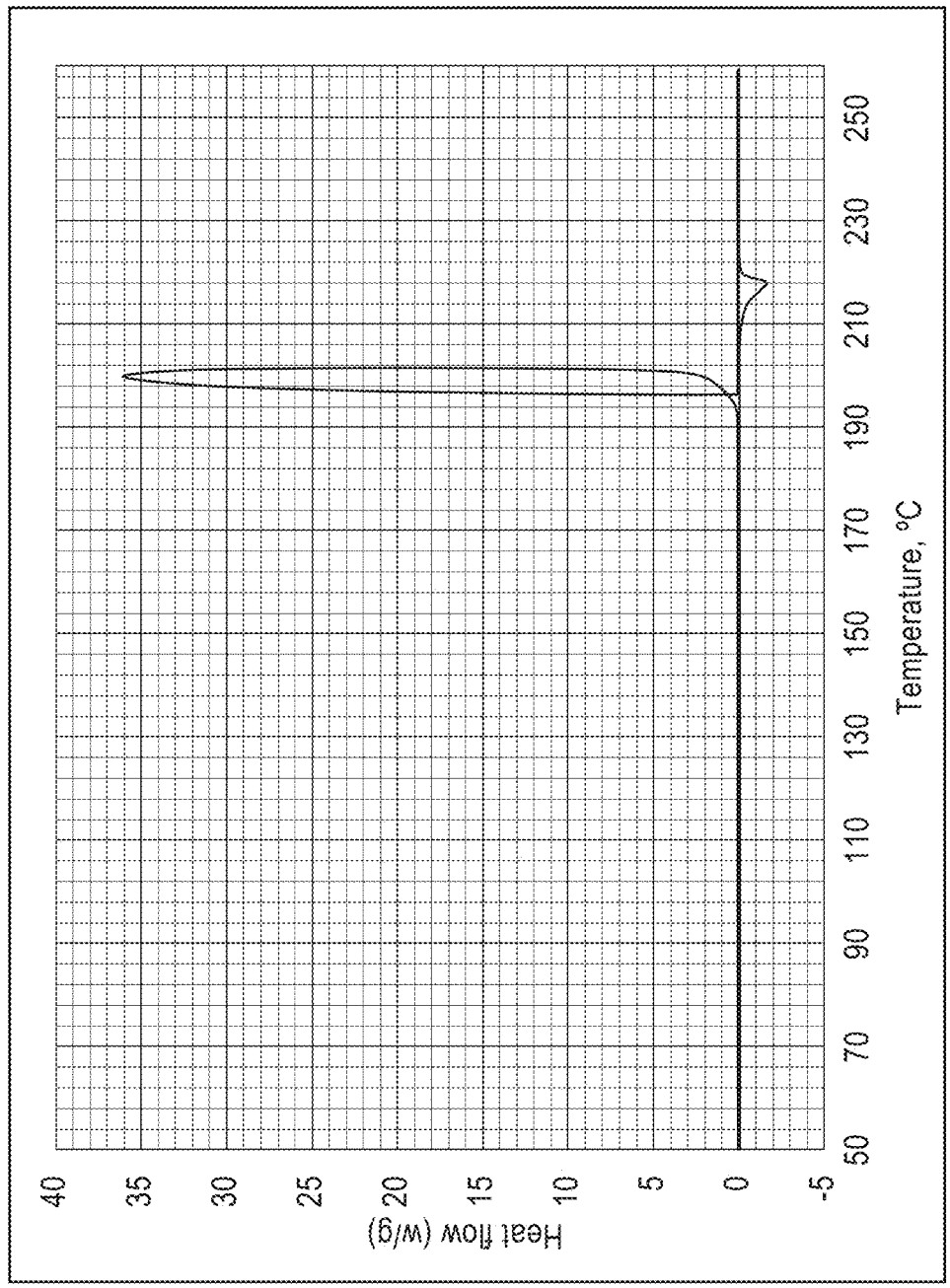
FIG. 7 is a differential scanning calorimetry (DSC) chart for an alloy according to the present disclosure.
Figure 8:
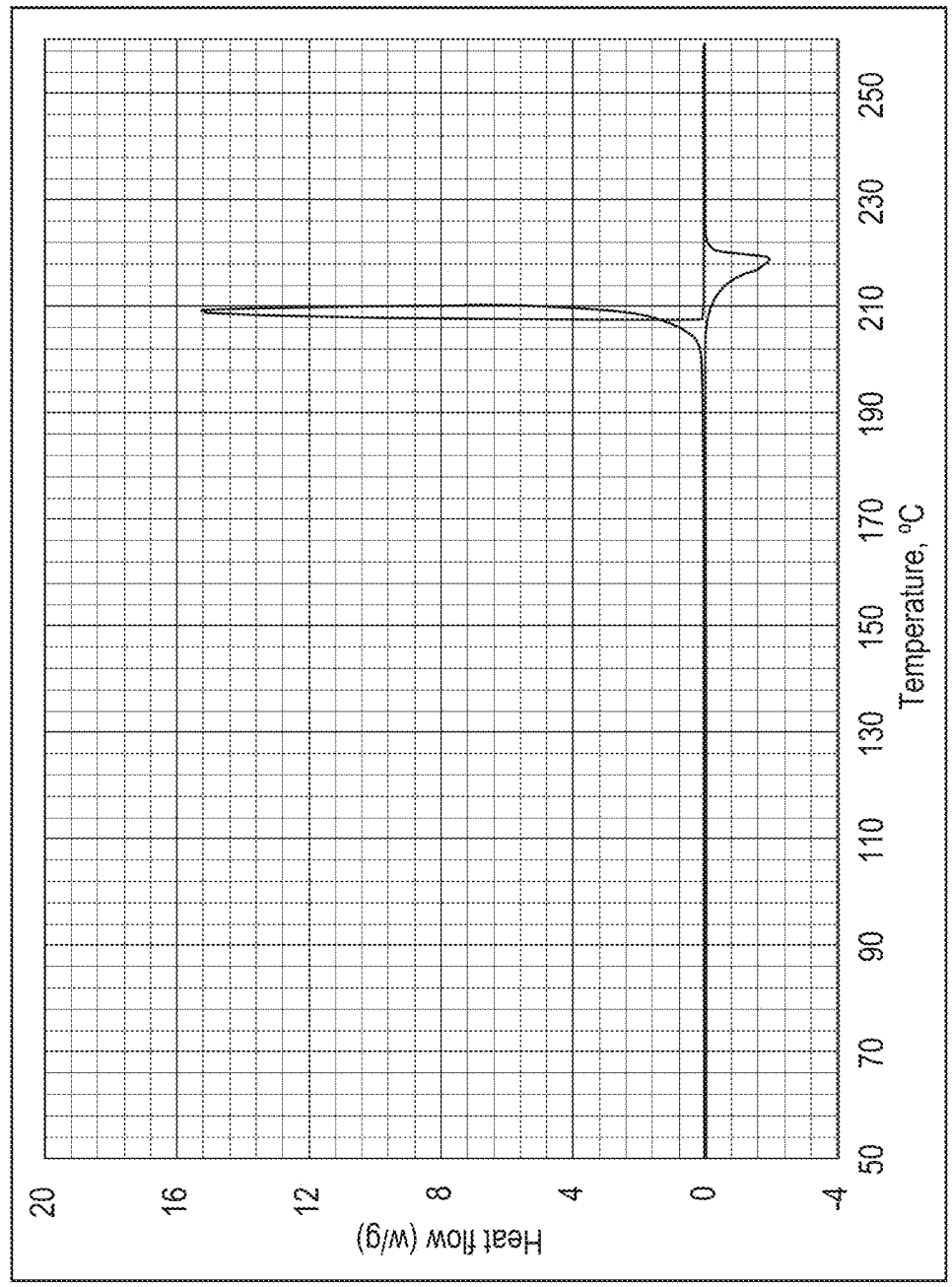
FIG. 8 is a differential scanning calorimetry (DSC) chart for an alloy according to the present disclosure.

As shown in FIGS. 3 to 8, the melting characteristics of solder alloys were determined by differential scanning calorimetry ("DSC"). The undercooling (i.e., the temperature difference between the onset of heating temperature and the onset of cooling temperature) was measured for the solder alloys. Undercooling occurs because precipitation of crystals is not spontaneous, but requires activation energy. FIG. 3 shows the DSC curve for a prior art SAC305 alloy comprising 96.5 wt. % tin, 3.0% silver, and 0.5 wt. % copper. FIGS. 4, 5, 6, 7, and 8 show the DSC curves for alloys according to the compositions of Examples 4.1, 4.2, 4.3, 4.4, and 4.5 shown in Table 4, respectively. In addition, data from the DSC analysis are shown in Table 6.

High undercooling behaviors of tin-silver-copper (Sn—Ag—Cu) solders indicate that molten tin solder is difficult to solidify. High undercooling is attributed to difficulty in nucleating a solid phase from the liquid phase. A large undercooling can influence microstructural features such tin dendrite, eutectic microstructure, primary intermetallic compounds ($Ag_3Sn$, $Cu_6Sn_5$) which in turn affects the mechanical properties of the solder. Such undercooling can have serious impact on the reliability of solder joints and cause an unfavorable situation where joints solidified at different times. This could lead to stress concentration into solidified joint and cause mechanical failure. For example, SAC305 alloy has an undercooling temperature of 20° C. In contrast, alloys according to the present disclosure demonstrate smaller undercooling, for example as low as 4.5° C., as shown for the Example 4.3 alloy.

As can be seen by comparing FIG. 3 with FIGS. 4 to 8, and by reviewing Table 6, several of the example alloys exhibit a noticeable reduction in undercooling as compared to the prior art SAC305 alloy. For example, for the prior art SAC305 alloy, the onset of heating ($T_1$) is at 217° C. and the onset of cooling ($T_2$) is at 197° C., providing an undercooling ($\Delta T$) of 20° C. For the Example 4.3 alloy, $T_1$ is at approximately 217.5° C. and $T_2$ is at approximately 213° C., providing an undercooling ($\Delta T$) of approximately 4.5° C.

Figure 9A:
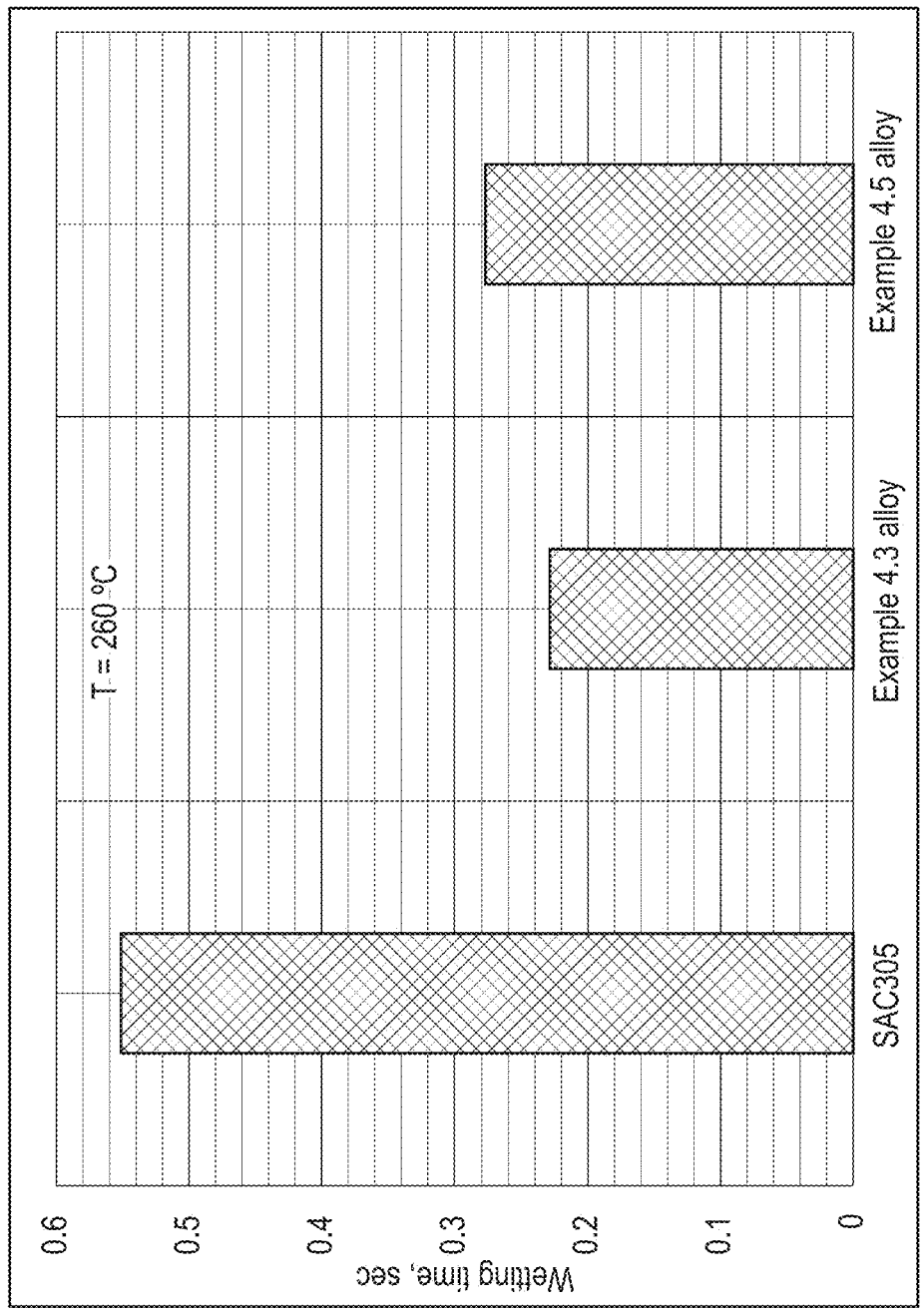
FIG. 9A is a bar chart showing a comparison between the wetting time of two alloys according to the present disclosure and a prior art SAC305 alloy.
Figure 9B:
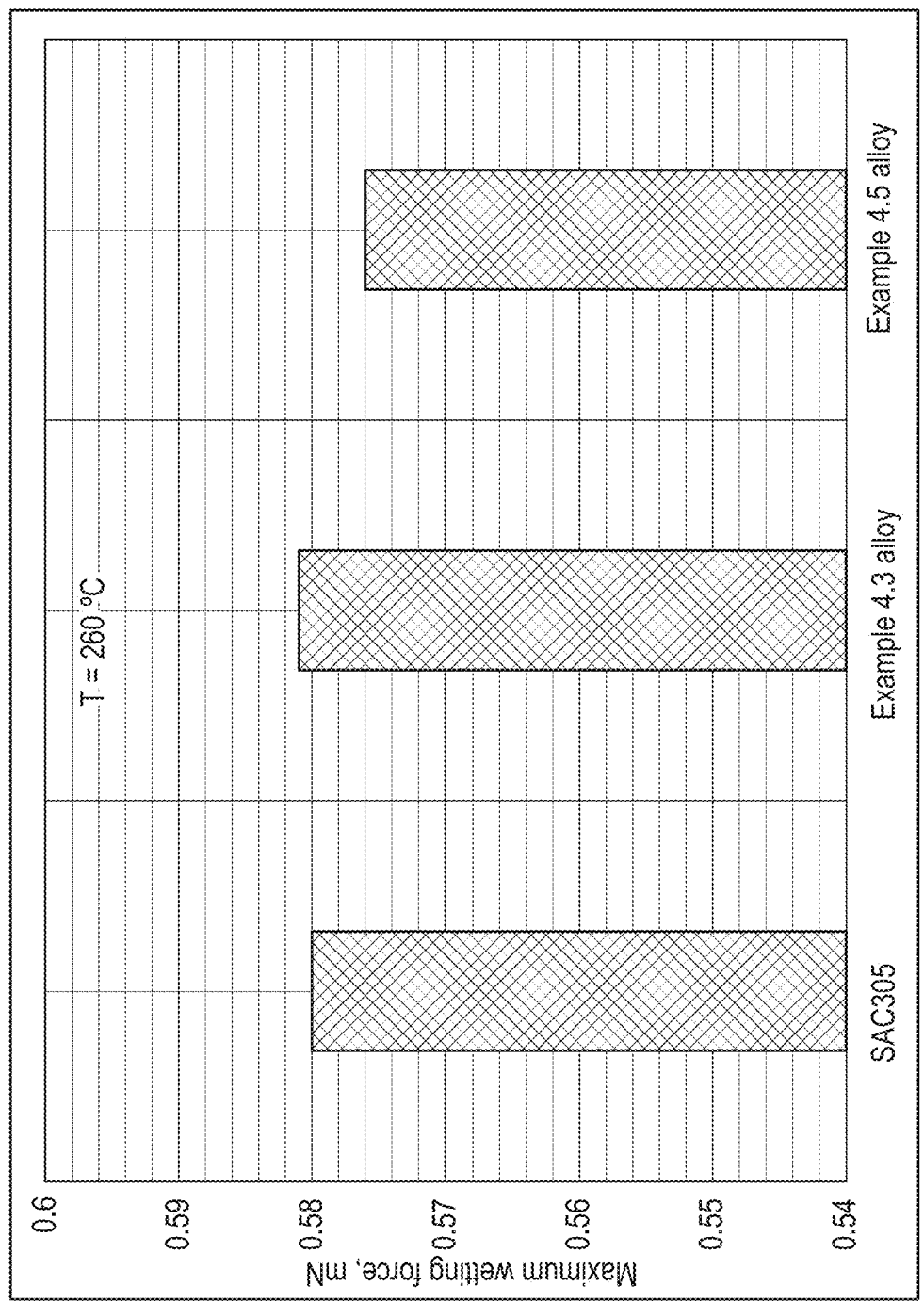
FIG. 9B is a bar chart showing a comparison between the maximum wetting force of two alloys according to the present disclosure and a prior art SAC305 alloy.

FIGS. 9A and 9B show a comparison between the wetting time (FIG. 9A) and the maximum wetting force (FIG. 9B) of a prior art SAC305 alloy, the Example 4.3 alloy, and the Example 4.5 alloy. The wetting experiments were performed according to IPC (Association Connecting Electronics Industries) standard IPC-TM-650. This standard involves a wetting balance test that involves determining the total wetting time and maximum wetting force. A shorter wetting time corresponds to a higher wettability. A shorter wetting time and a higher wetting force reflects better wetting performance and correlates with spread and fillet formation under a given soldering process. FIGS. 9A and 9B demonstrate that the wetting properties of the Example 4.3 and 4.5 alloys are better than (or at a minimum comparable to) the prior art SAC305 alloy.

Wetting performance of solder can also be expressed in terms of spread ratio and spreadability. The spread area indicates how much solder is on the soldering pad substrate, and can be indicated as a spread ratio. A spread test was performed in accordance with the IPC (IPC J-STD-004B, TM 2.4.46) and JIS Z 3197 standards. Spread ratio and spreadability were investigated for three different substrates: bare copper (Cu), Organic Solderability Preservative (OSP) coated copper, and Electroless Nickel Immersion Gold (ENIG) plated copper. The solder alloys (circular preform) were melted onto the substrate being tested using flux. The wetted area was measured using an optical microscope before and after the test. The spread ratio is calculated by wetted area after reflow/melt divided by wetted area before reflow/melt. The solder height was measured to calculate the spreadability (or spread factor). Spreadability was calculated using the following formula, where $S_R$=spreadability, D=diameter of solder (assumed to be spherical), H=height of spread solder, and V=volume of solder (g/cm$^3$) (estimated from mass and density of tested solder):

$$S_R = \frac{D-H}{D} \times 100 \text{ where } D = 1.248 \times V^{1/3}$$

Figure 10A:
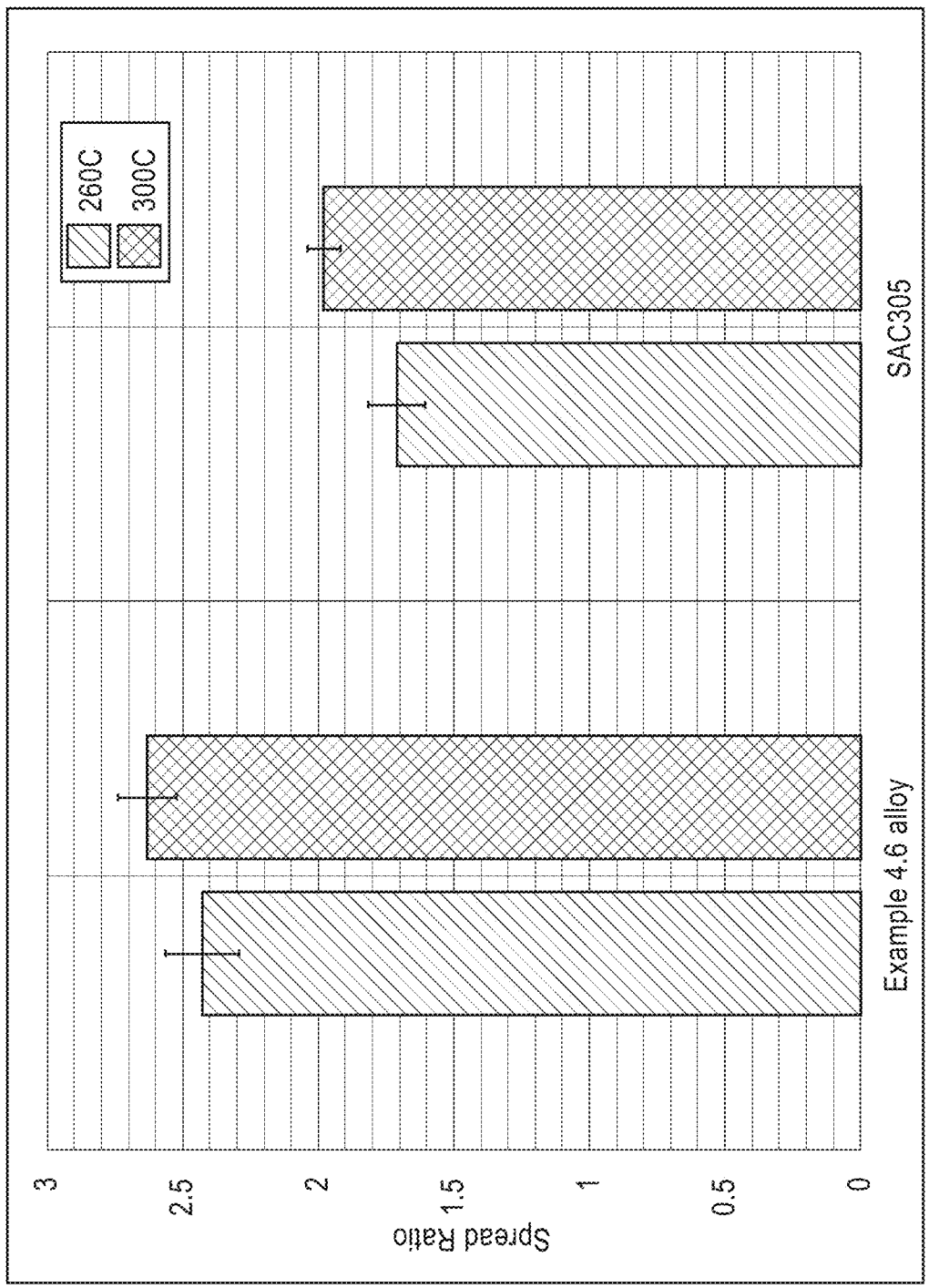
FIG. 10A is a bar chart showing a comparison between the spread ratio of an alloy according to the present disclosure and a prior art SAC305 alloy.
Figure 10B:
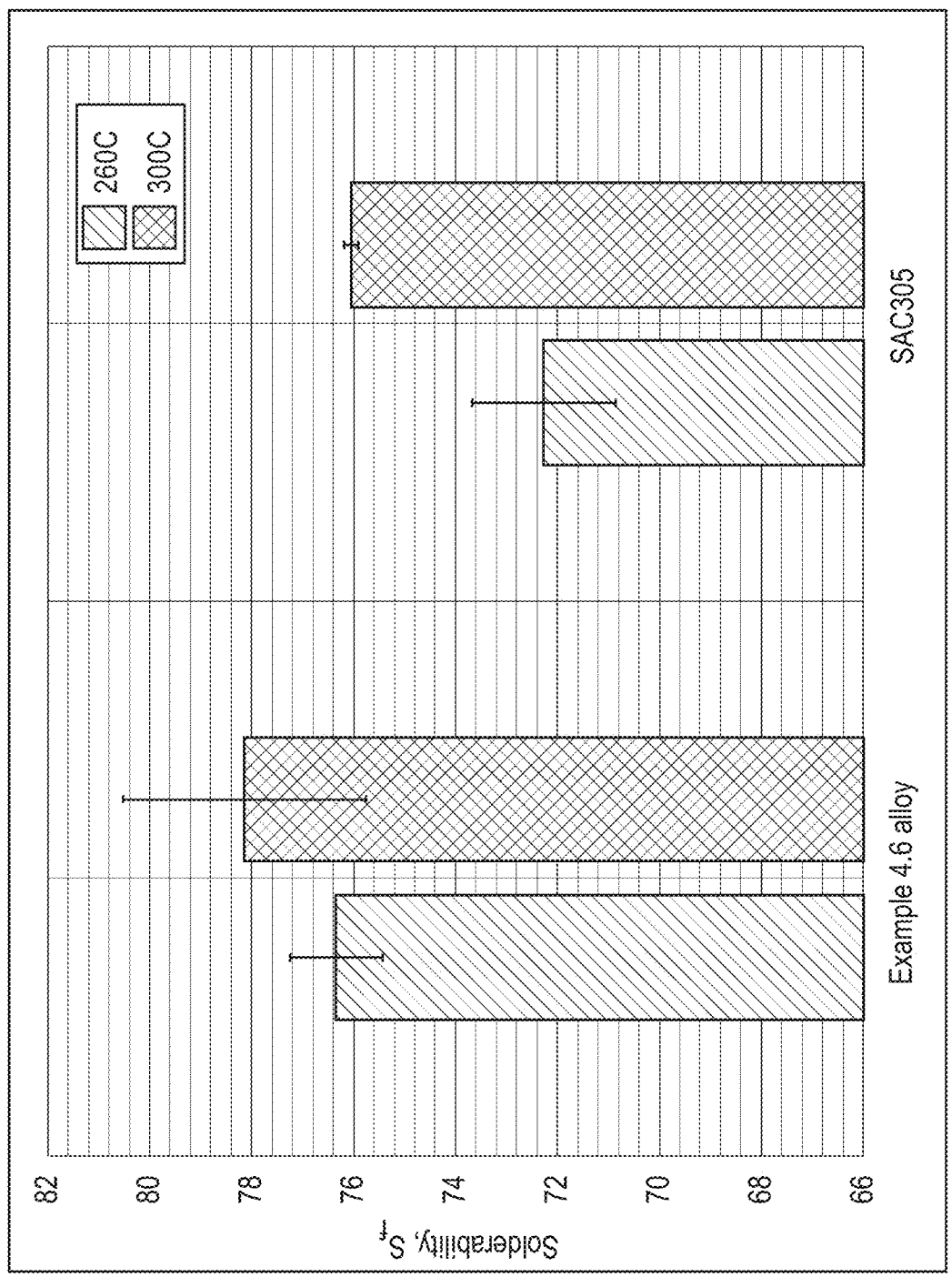
FIG. 10B is a bar chart showing a comparison between the spreadability of an alloy according to the present disclosure and a prior art SAC305 alloy.

FIG. 10A shows a comparison between the spread ratio of the Example 4.6 alloy as compared to a prior art SAC alloy on a bare copper substrate at two different temperatures (260° C. and 300° C.). FIG. 10B shows a comparison between the spreadability of the Example 4.6 alloy as compared to a prior art SAC alloy at two different temperatures (260° C. and 300° C.).

Figure 11A:
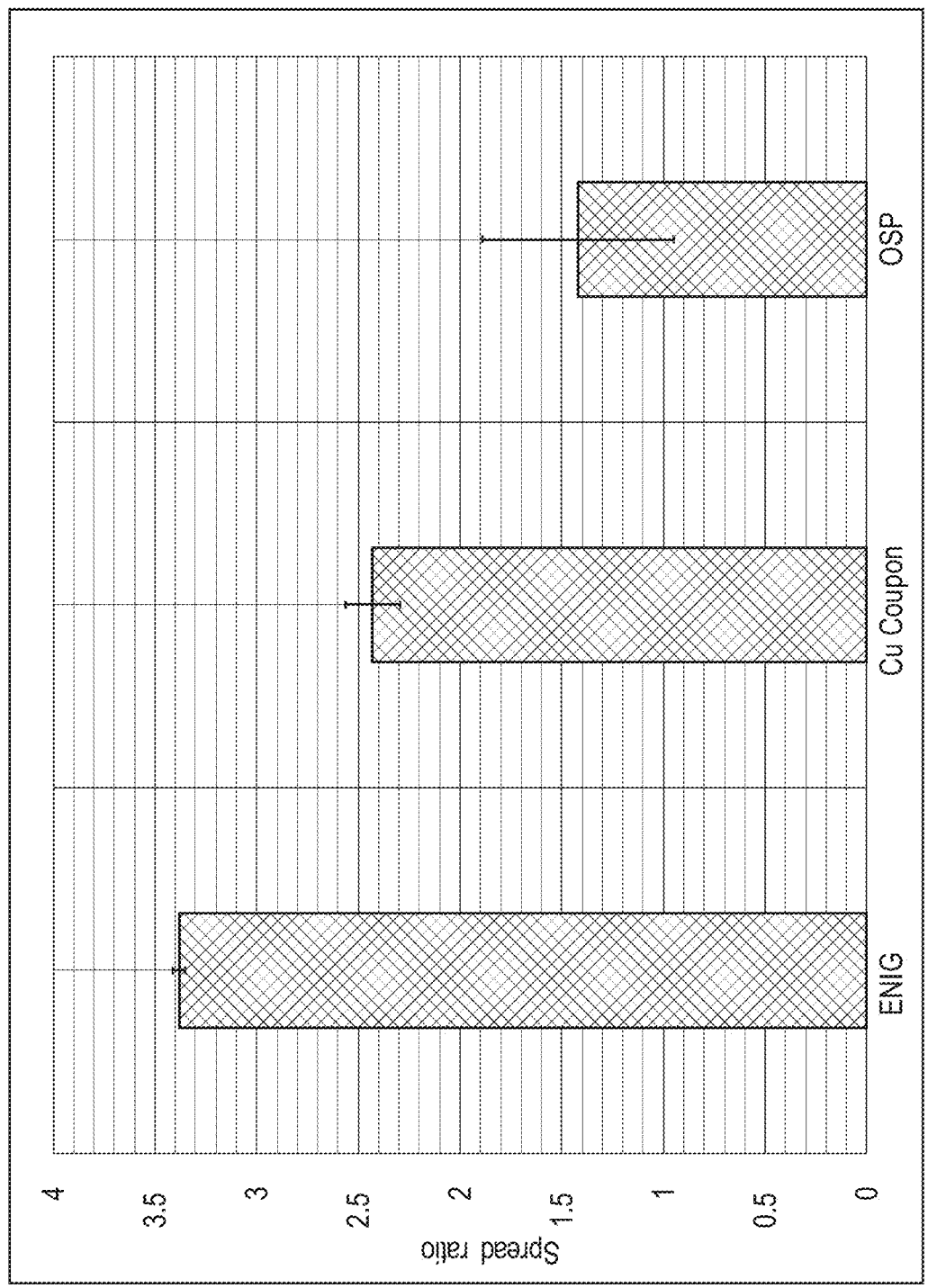
FIG. 11A is a bar chart showing the spread ratio of an alloy according to the present disclosure on three different substrates.
Figure 11B:
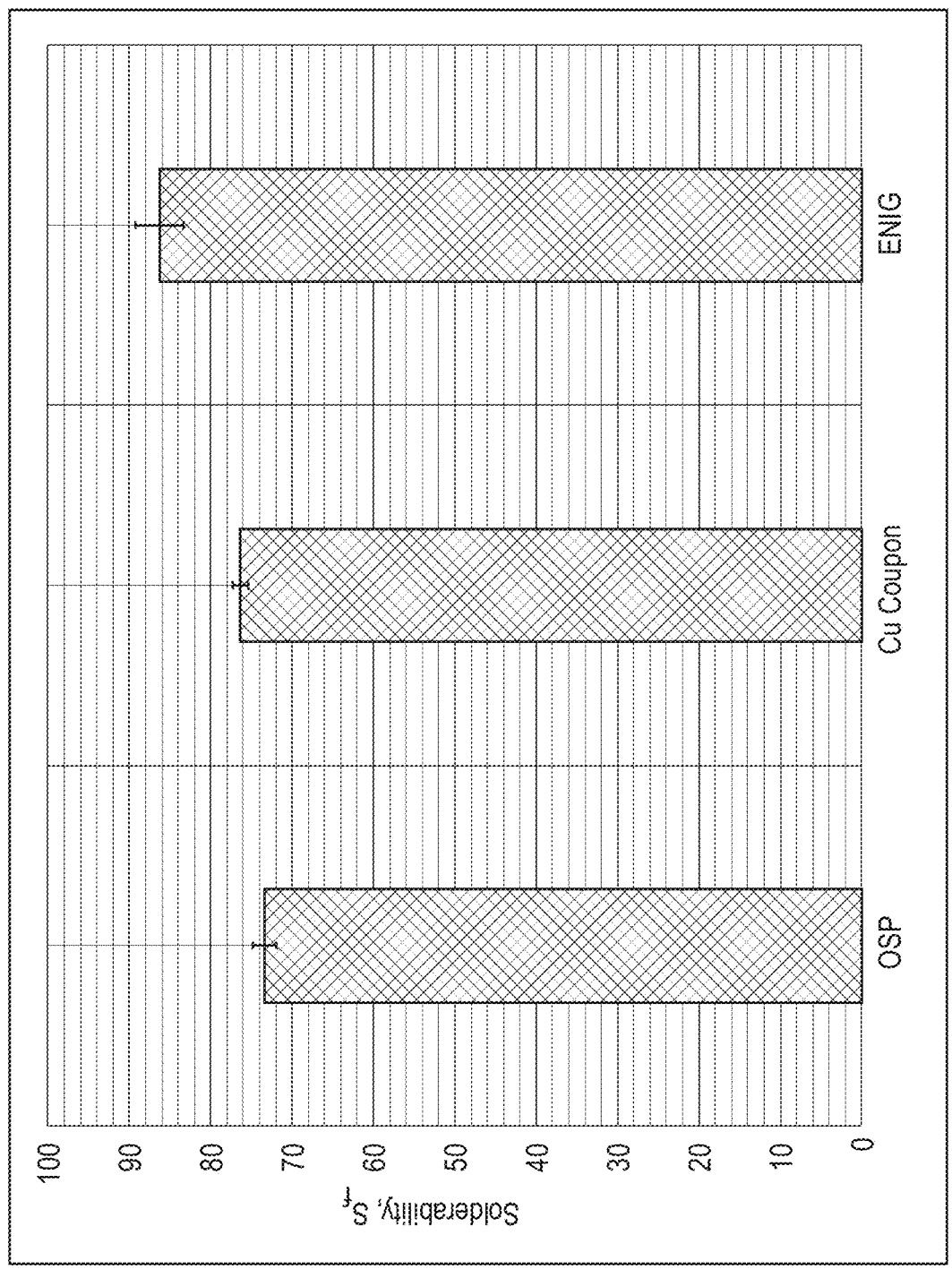
FIG. 11B is a bar chart showing the spreadability of an alloy according to the present disclosure on three different substrates.

FIG. 11A shows a comparison between the spread ratio of the Example 4.6 alloy on three different copper substrates (OSP, bare copper, and ENIG) at 255° C. FIG. 11B shows a comparison between the spreadability of the Example 4.6 alloy on three different copper substrates (OSP, bare copper, and ENIG) at 255° C.

Figure 12A:
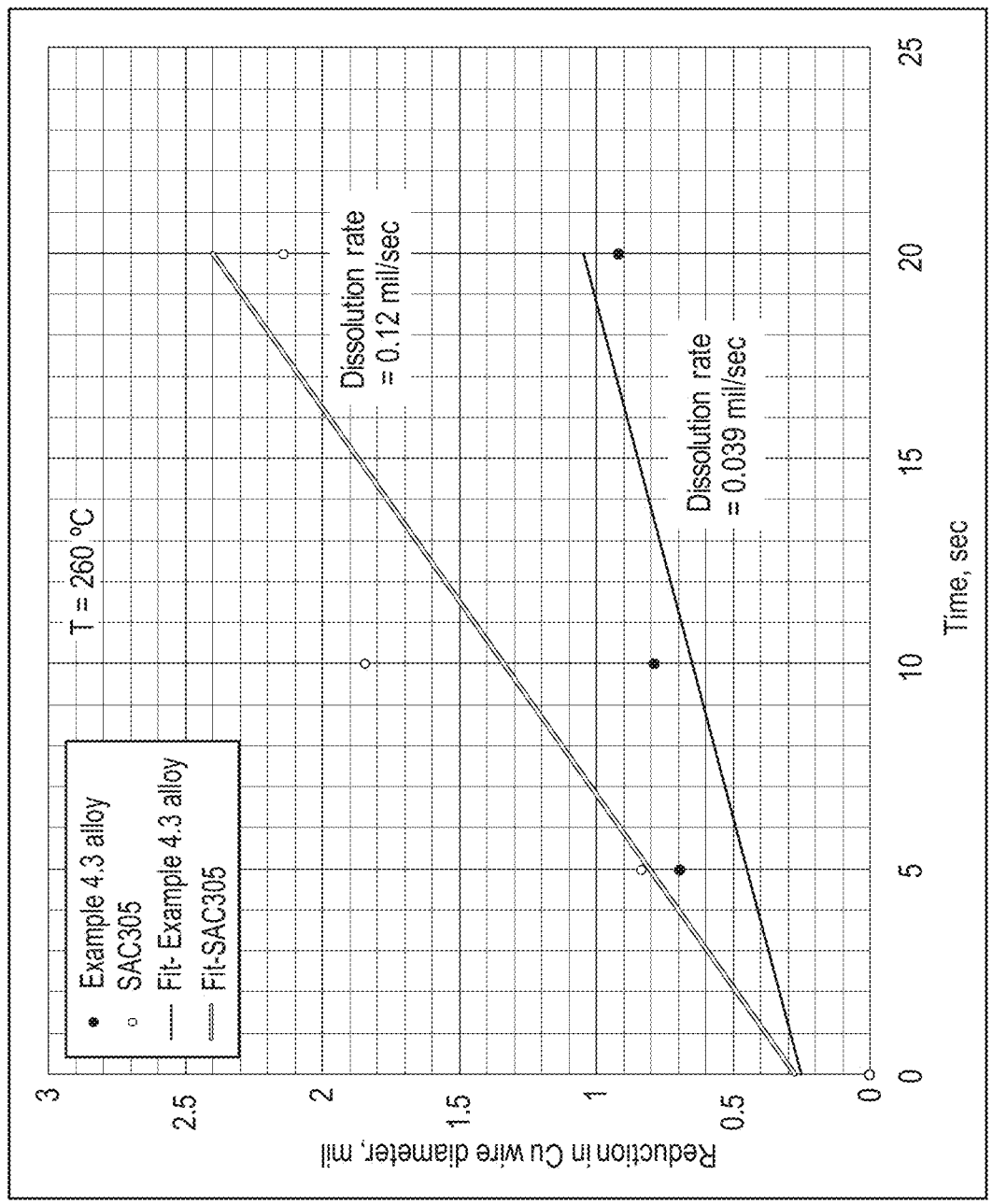
FIG. 12A is a line chart showing a comparison between the copper wire dissolution rate of an alloy according to the present disclosure and a prior art SAC305 alloy at 260° C.
Figure 12B:
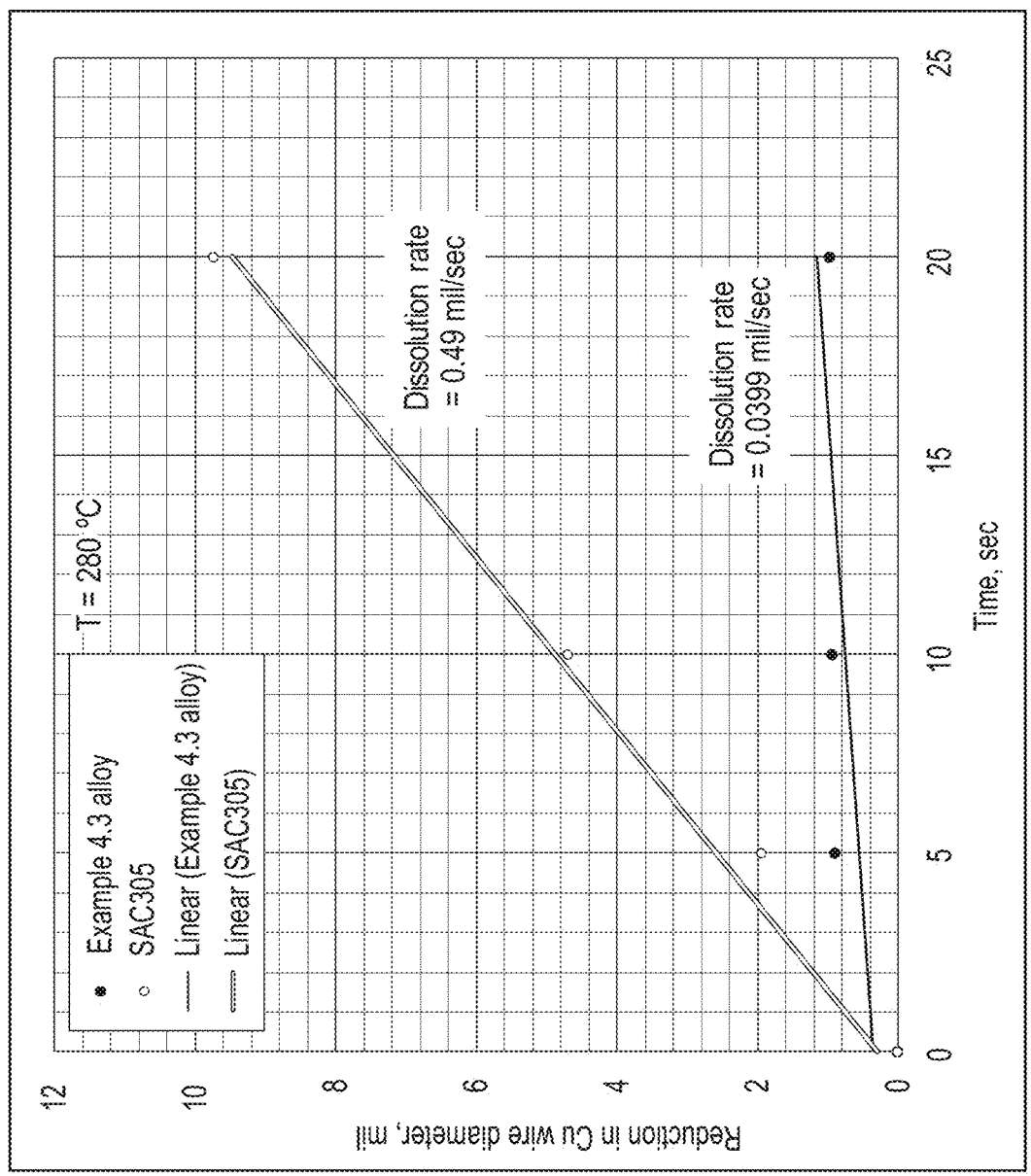
FIG. 12B is a line chart showing a comparison between the copper wire dissolution rate of an alloy according to the present disclosure and a prior art SAC305 alloy at 280° C.
Figure 13A:
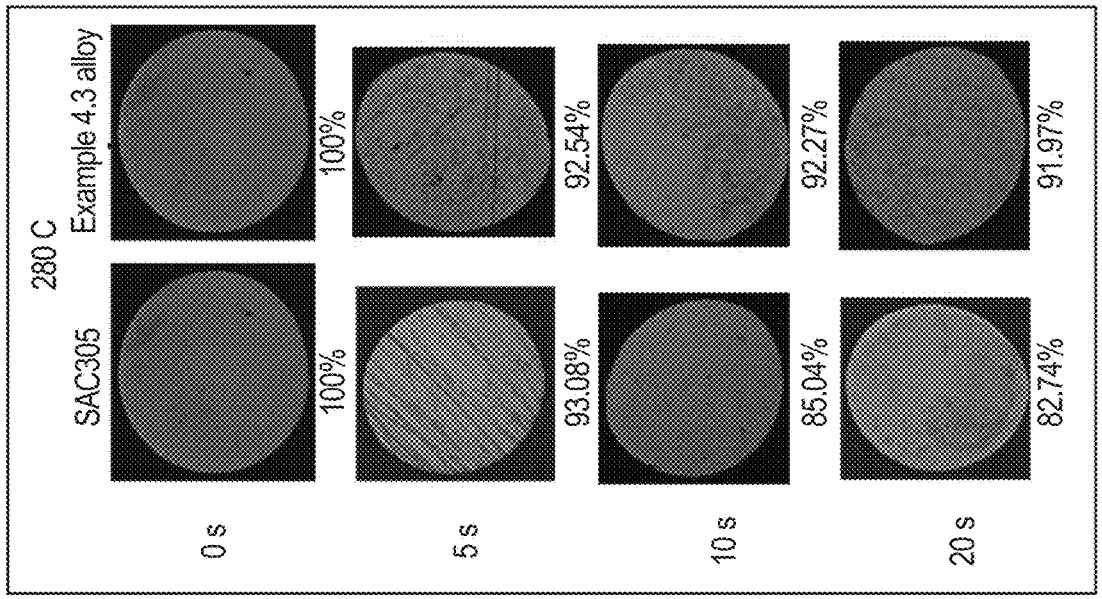
FIG. 13A shows a comparative series of optical micrographs comparing the copper wire dissolution rate of an alloy according to the present disclosure and a prior art SAC305 alloy at 260° C.
Figure 13B:
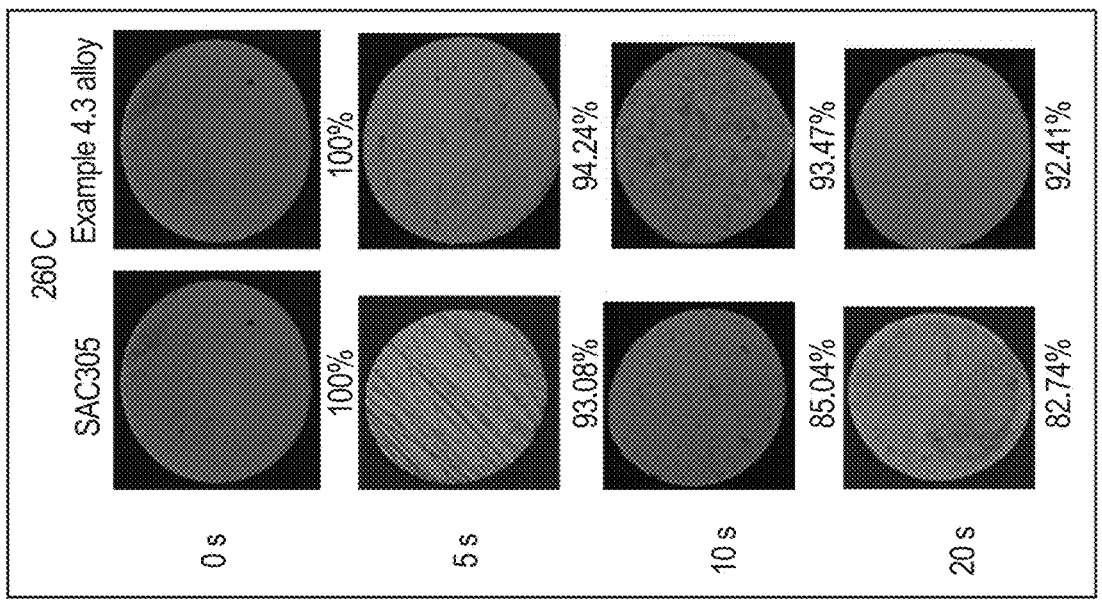
FIG. 13B shows a comparative series of optical micrographs comparing the copper wire dissolution rate of an alloy according to the present disclosure and a prior art SAC305 alloy at 280° C.
Figure 16:
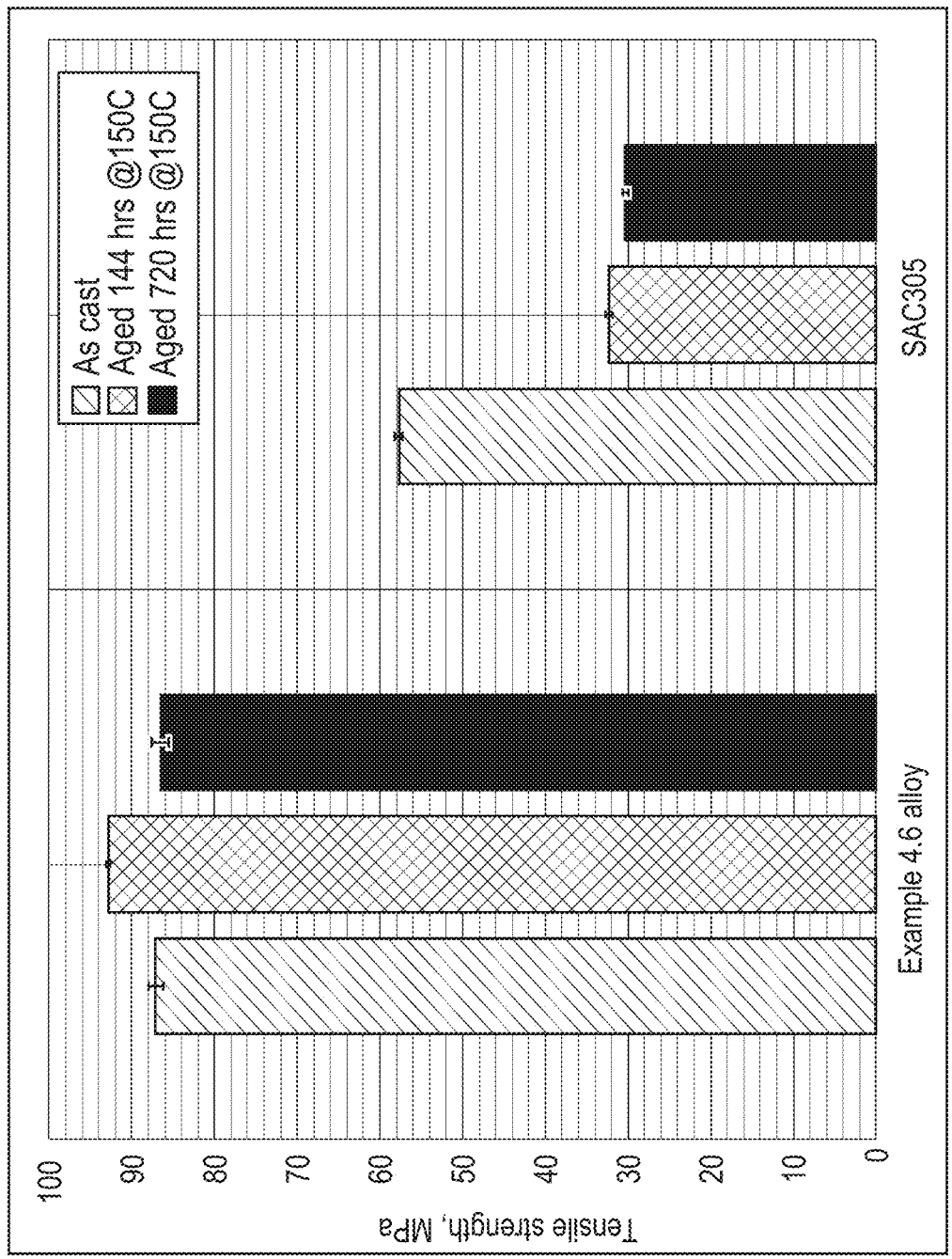
FIG. 16 is a bar chart showing a comparison of the ultimate tensile strength of an alloy according to the present disclosure and a prior art SAC305 alloy.

FIGS. 12A, 12B, 13A, and 13B show a comparison between the copper dissolution rate of a prior art SAC305 alloy and the Example 4.3 alloy (Alloy-M) at 260° C. (FIGS. 12A and 13A) and at 280° C. (FIGS. 12B and 13B). As can be seen in these figures, the copper dissolution rate is slower for the Example 4.3 alloy as compared to the prior art SAC305 alloy. The copper dissolution tests were performed using pure copper wire that was washed, degreased, cleaned in acid solution, rinsed, and dried. The tests were conduct at two temperatures: 260° C. and 280° C. The copper wires were exposed to molten solder for 5 seconds, 10 seconds, and 20 seconds. Cross sections of the copper wires were analyzed by optical microscopy, including to perform area measurement and analysis.

at room temperature at a strain rate of $10^{-2}$ s$^{-1}$. The ultimate tensile strength and yield strength of the alloys are shown in Table 8. The significant improvement of tensile strength shown in the Example 4.6 alloy may be due to the addition of bismuth and solid solution strengthening effect. The Example 4.6 alloy is also shown to be more ductile than the prior art SAC305 alloy. The tensile strength properties of the Example 4.6 alloy and prior art SAC305 alloy after aging at 150 QC are shown in FIG. 16. Both the Example 4.6 alloy and the prior art SAC305 alloy show a reduction in ultimate tensile strength after aging at an elevated temperature, but the reduction is considerably more marked for the prior art SAC305 alloy, which exhibited about a 42% reduction in tensile strength.

TABLE 8

| Alloy | Alloy Composition | Ultimate Tensile Strength, MPa | Yield Strength, MPa |
|---|---|---|---|
| SAC305 | Sn—3.0Ag—0.5Cu | 57.72 ± 0.24 | 49.72 ± 0.19 |
| Example 4.6 | Sn—0.8Cu—3.8Ag—3Bi—1.5Sb—0.05Co—0.008Ti | 84.11 ± 1.37 | 79.42 ± 1.48 |

Figure 14A:
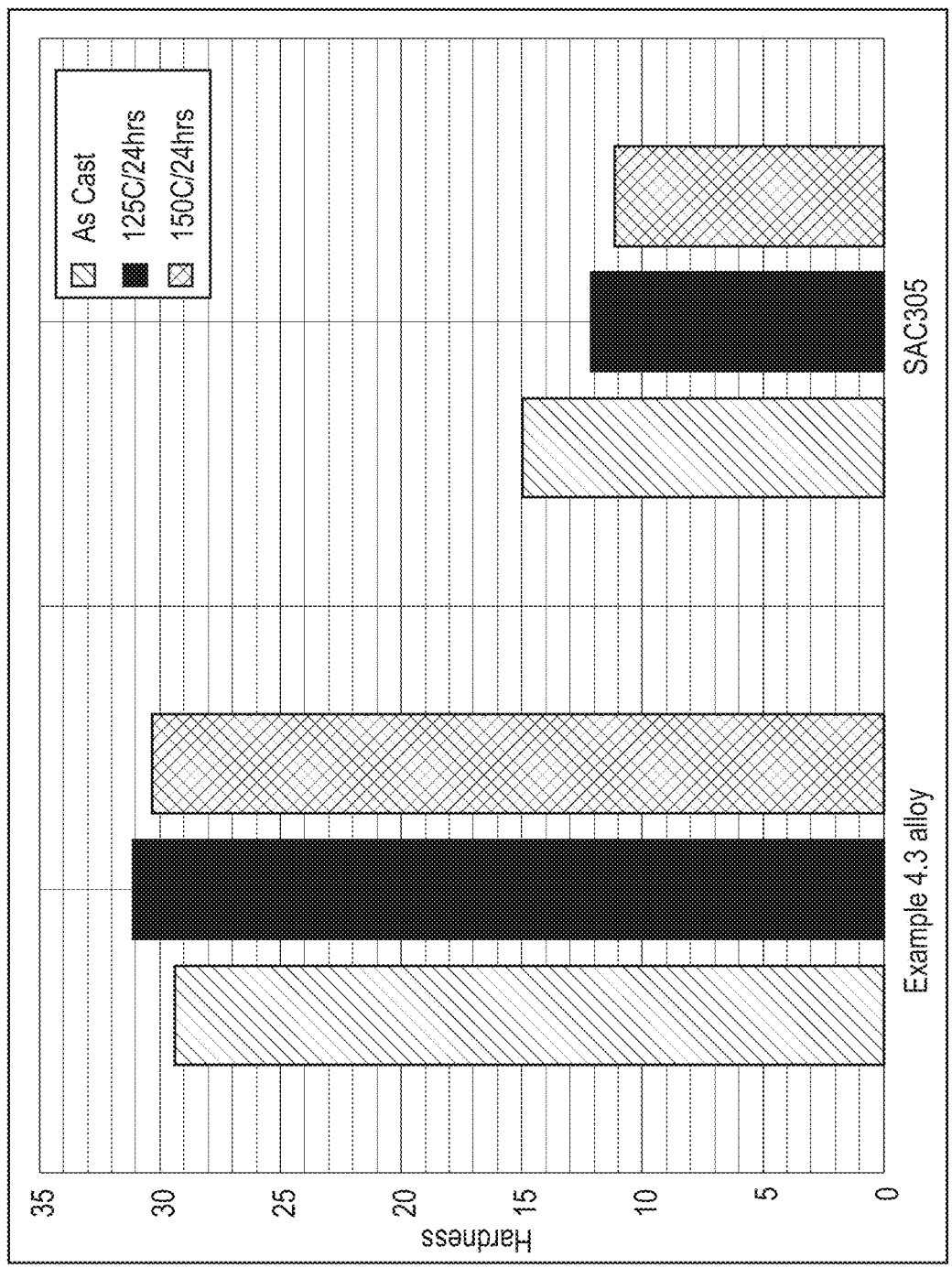
FIG. 14A is a bar chart showing a comparison between the hardness of an alloy according to the present disclosure and a prior art SAC305 alloy.
Figure 14B:
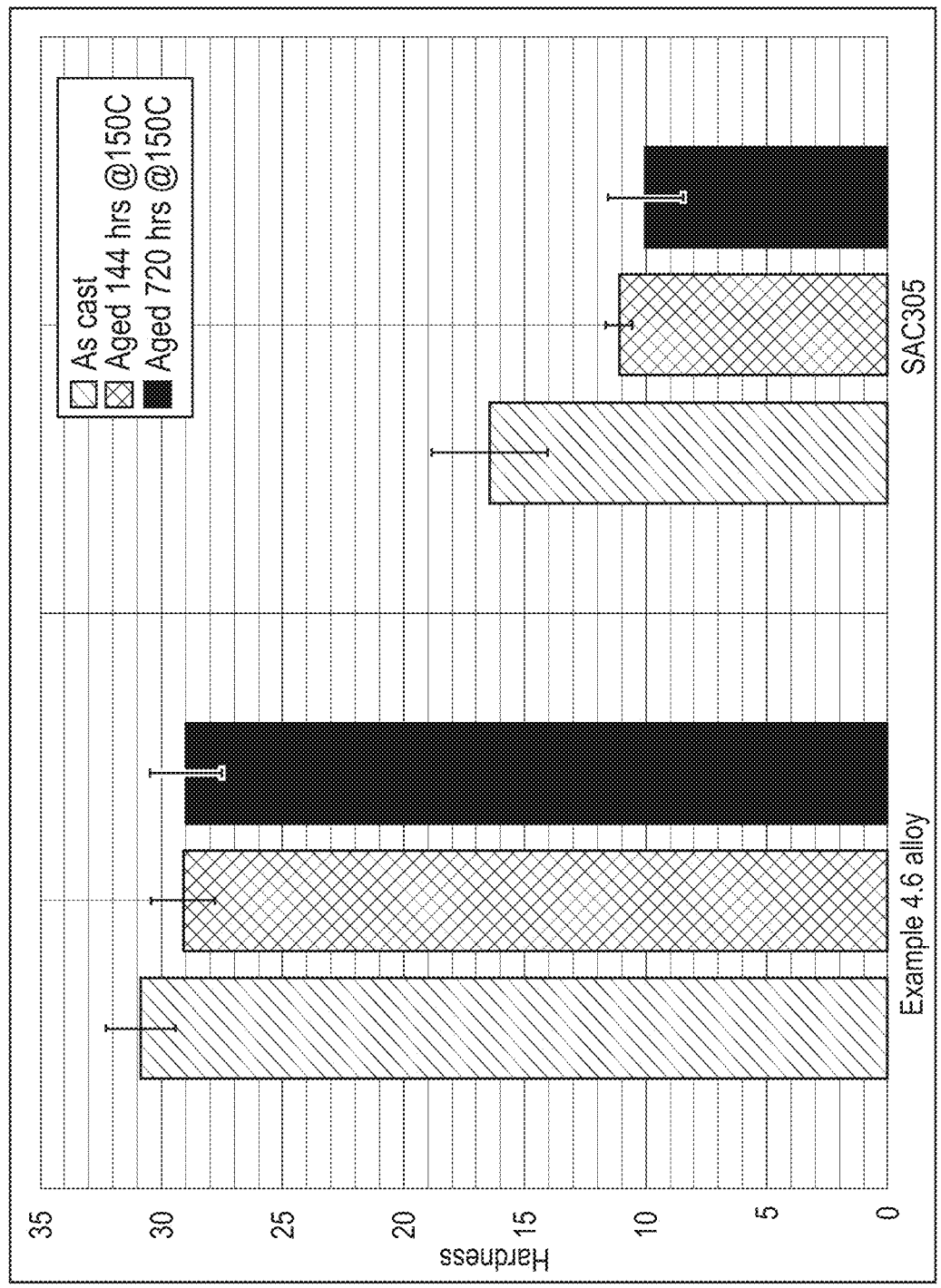
FIG. 14B is a bar chart showing a comparison between the hardness of an alloy according to the present disclosure and a prior art SAC305 alloy, where both alloys have been isothermally aged at 150° C.

FIG. 14A shows the hardness values of the Example 4.5 alloy as compared to a prior art SAC305 alloy. As can be seen from the bar chart, the hardness of the Example 4.5 alloy is approximately twice the hardness of the prior art SAC305 alloy. FIG. 14B shows the hardness values of the Example 4.6 alloy as compared to a prior art SAC305 alloy. The Example 4.6 alloy retains its hardness after aging, in contrast to the prior art SAC305 alloy, as shown in FIG. 14B, which shows the result of hardness testing as cast, after aging 144 hours at 150° C., and after aging 720 hours at 150° C.

The coefficient of thermal expansion (CTE) of the alloys according to the current disclosure was also measured. Mismatches between the CTE of a solder and an underlying substrate can lead to fatigue failure during cyclic loading. As the CTE mismatch increases, so too does the shear strain, which decreases the thermal cycle life of a component. Cracks may start and propagate at sites of stress concentration due to a CTE mismatch. Cracking in solder joints may be reduced by reducing the difference between the CTE of a solder and an underlying substrate. Table 7 shows the CTE of an alloy according to the present disclosure compared to a prior art SAC305 alloy and with reference to the CTE of an example underlying substrate.

Figure 17:
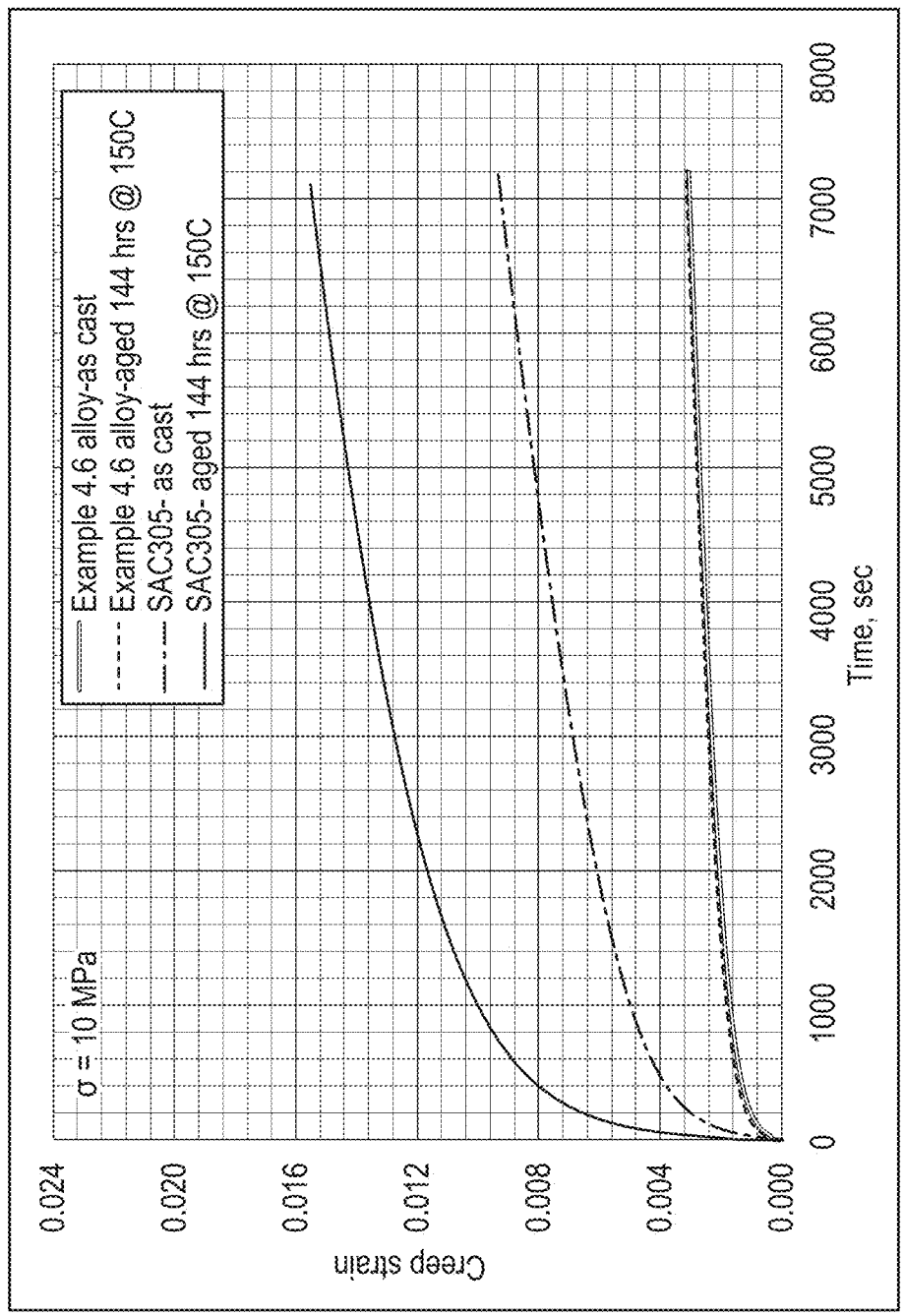
FIG. 17 is a line chart showing creep strain as a function of time for an alloy according to the present disclosure and a prior art SAC305 alloy both as cast and after aging for 144 hours at 150° C.

Creep deformation is a major failure mode of solder joints in microelectronic packaging because of the high homologous temperatures involved. Solder experiences thermomechanical stresses due to different coefficient of thermal expansion (CTE) between the chip and other layers within the packages. These stresses can cause plastic deformation over a long period of service. Solder alloys may undergo creep deformation even at room temperature. In real life applications, electronic modules can operate over a temperature range of −40 QC to +125 QC, which is in the range of 0.48 to 0.87 $T_m$ (fraction of the melting temperature of the solder). For devices under stress, this is a rapid creep deformation range. Thus, a thorough understanding of creep deformation in lead-free solder is an important concern for the electronic packaging industry. Casting solders were machined and cut into rectangular pieces of size 120 mm×6 mm×3 mm. Samples were isothermally aged at 150 QC for up to 144 hours. Creep tests were conducted at room temperature at a stress level of 10 MPa. As shown in FIG. 17, the Example 4.6 alloy shows superior creep resistance as compared to a prior art SAC305 alloy. The creep resistance exhibited by the example alloy may be due to the addition of microalloys to refine the microstructure and strengthening mechanisms such as solid solution and precipitation hardening.

TABLE 7

| Alloy | Alloy/Substrate Composition | Temperature Range, ºC. | CTE, ppm/ºC. |
|---|---|---|---|
| SAC305 | Sn—3.0Ag—0.5Cu | 30-150 | 24.0 |
| Example 4.6 | Sn—0.8Cu—3.8Ag—3Bi—1.5Sb—0.05Co—0.008Ti | 30-150 | 22.88 |
| Example Substrate | Copper | 30-150 | 16.7 |

Figure 15:
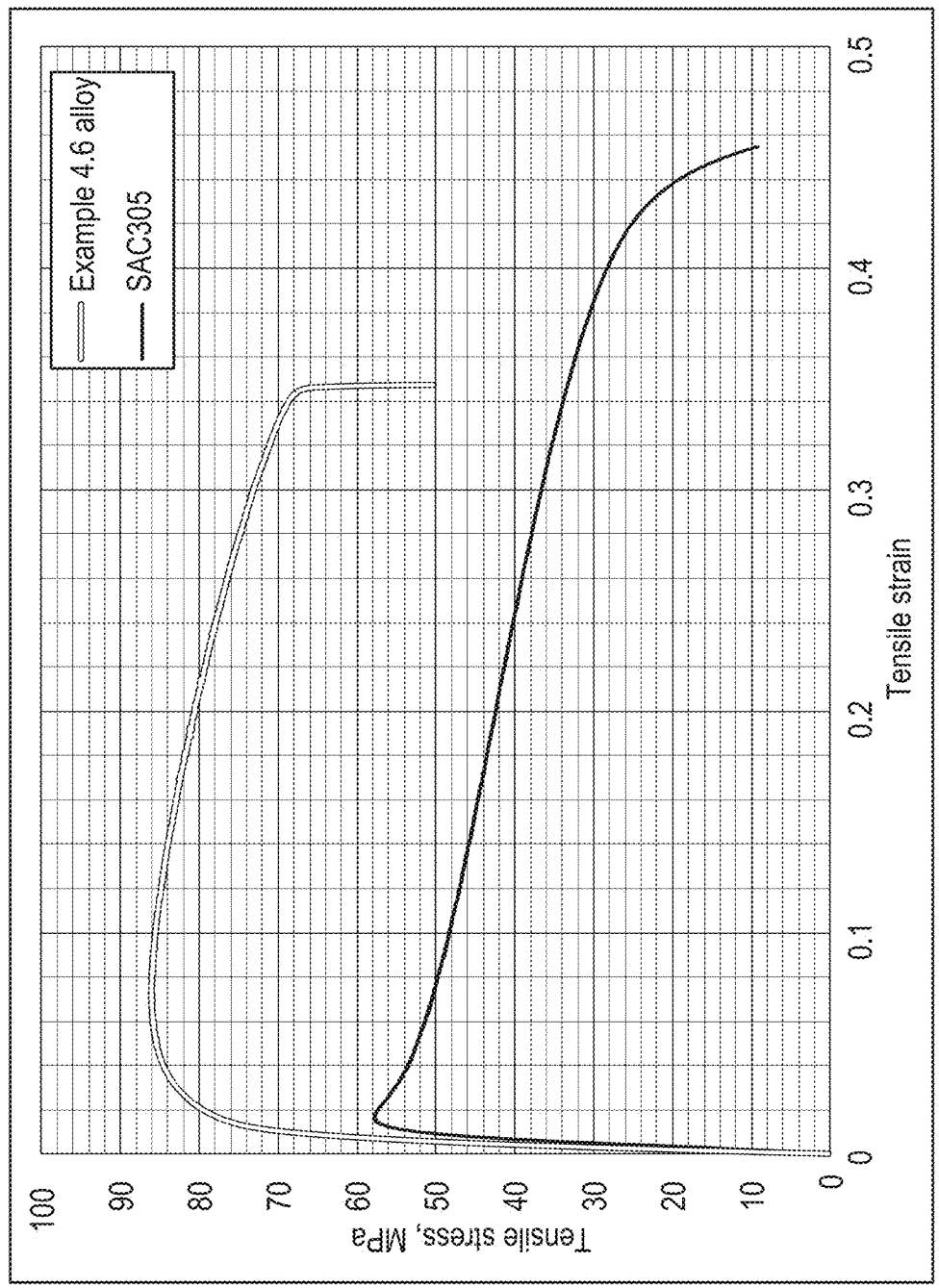
FIG. 15 is a line chart showing stress-strain curves for an alloy according to the present disclosure and a prior art SAC305 alloy.

A tensile stress-strain chart of an example alloy according to the present disclosure (Example 4.6 alloy) as compared to a prior art SAC305 alloy is shown in FIG. 15. Casting solders were machined and cut into rectangular pieces of size 100 mm×6 mm×3 mm. Samples were isothermally aged at 150 QC for up to 720 hours. Tensile tests were conducted During a soldering operation, materials from the solid substrate dissolve and mix with the solder, allowing intermetallic compounds (IMCs) to form. A thin, continuous, and uniform IMC layer tends to be important for good bonding. Without IMCs, the solder/conductor joint tends to be weak because no metallurgical interaction occurs in the bonding.

However, a thick IMC layer at the interface may degrade the reliability of the solder joints because a thick IMC layer may be brittle. IMC layers formed between solder and OSP substrate as a function of exposure time and temperature were examined. Solder alloys were melted on an OSP substrate and reflowed in an Electrovert OmniExcel 7 Zone Reflow oven using flux. Solder alloy samples were then exposed to an elevated temperature at 150 QC for up to 1440 hours. IMC layers were evaluated at different periods of aging time.

Figures 18A, 18B:
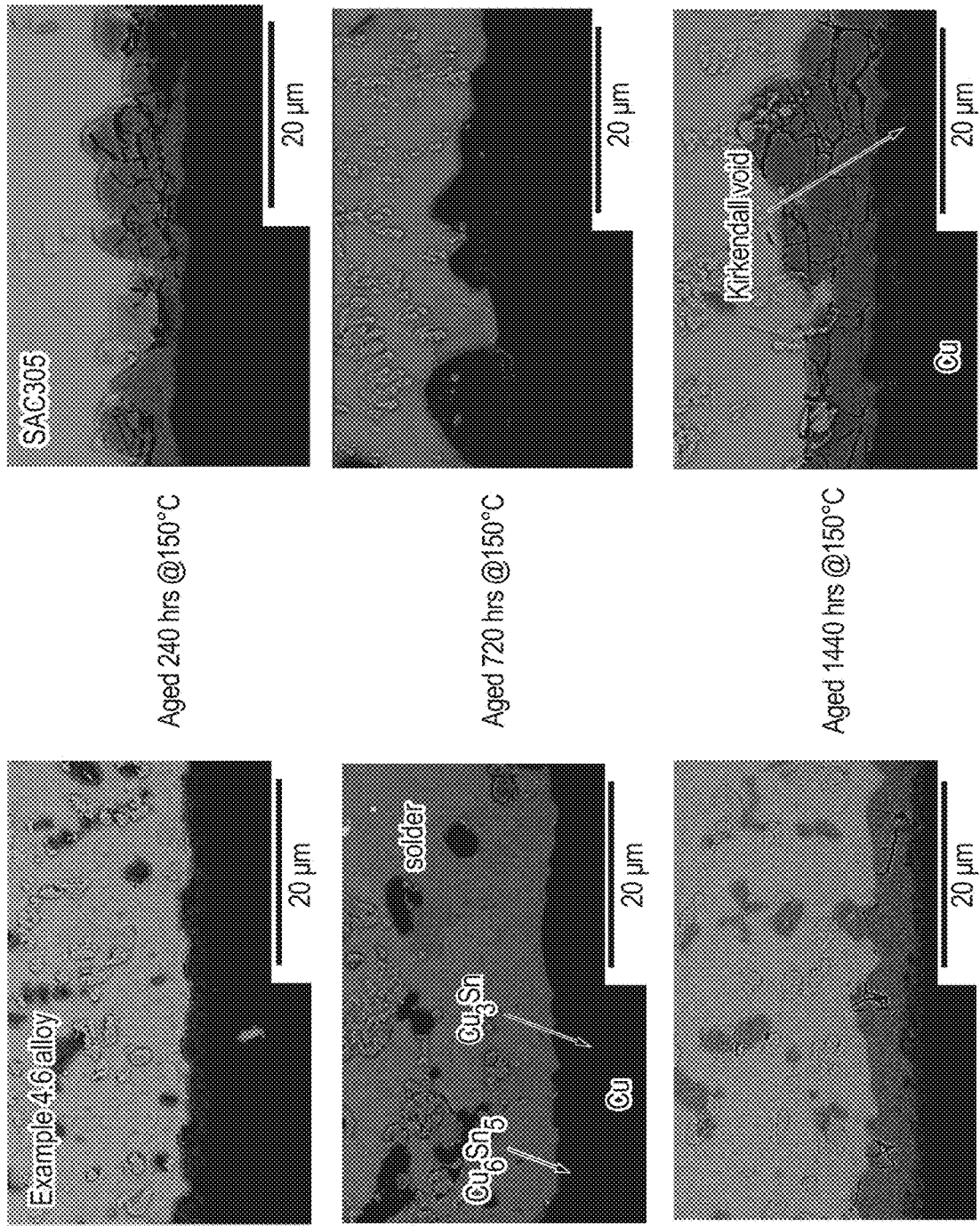
FIG. 18A shows a series of micrographs of the interface between an alloy according to the present disclosure and an underlying copper substrate after aging at 150° C. for 240, 720, and 1440 hours.
FIG. 18B shows a series of micrographs of the interface between a prior art SAC305 alloy and an underlying copper substrate after aging at 150° C. for 240, 720, and 1440 hours.
Figure 19:
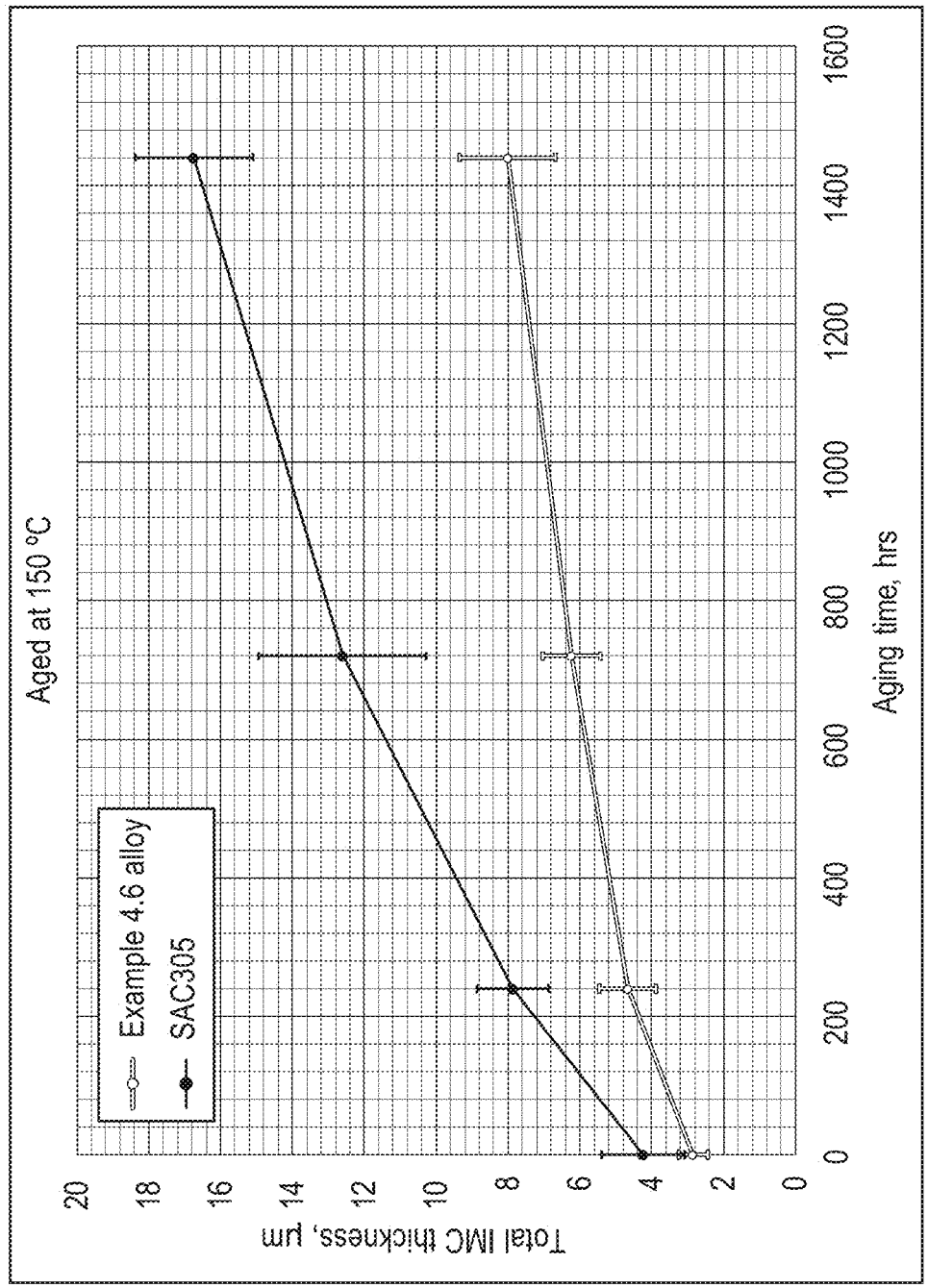
FIG. 19 is a line chart showing total IMC thickness as a function of aging time at 150° C. for an alloy according to the present disclosure and a prior art SAC305 alloy.
Figure 20:
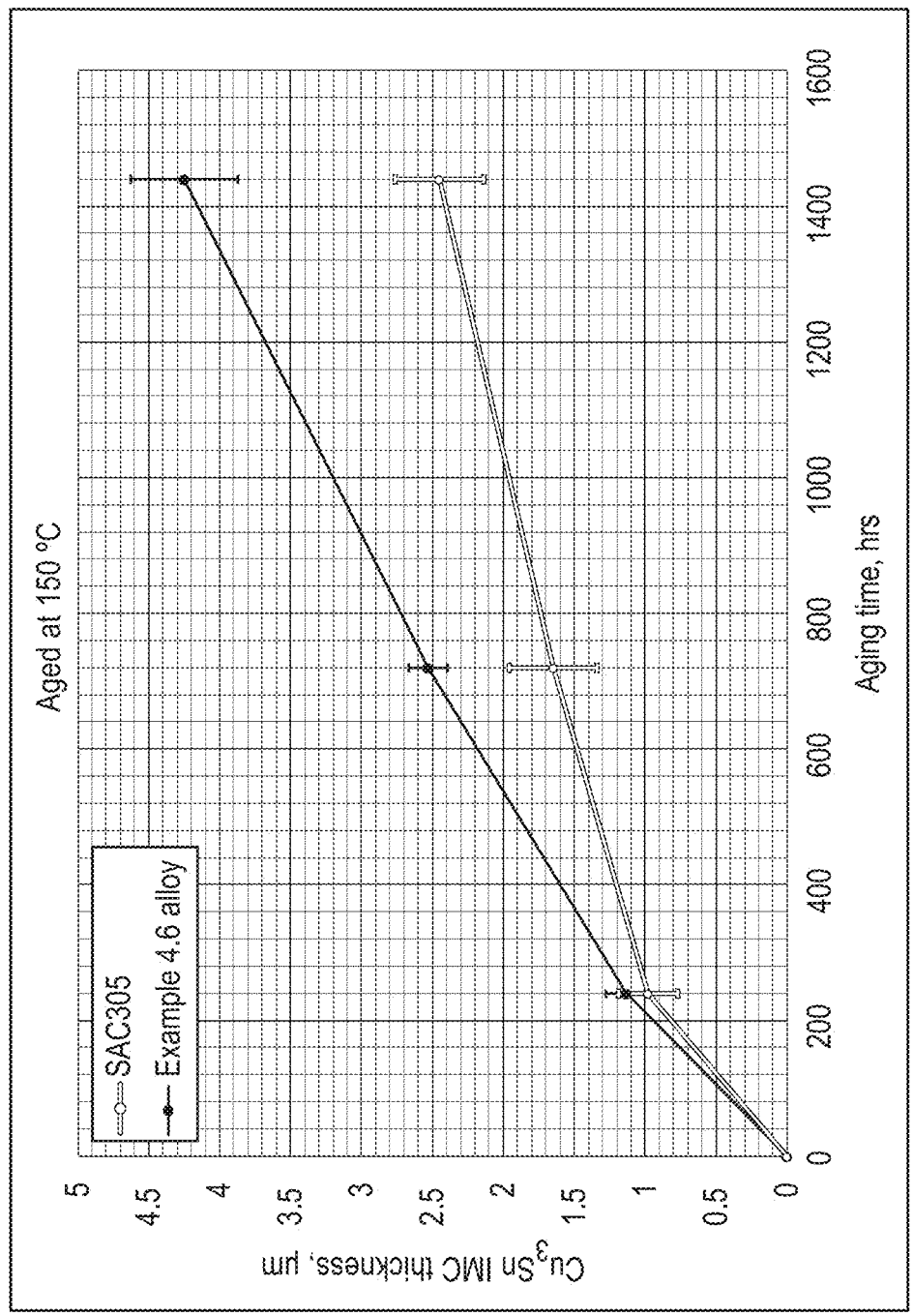
FIG. 20 is a line chart showing $Cu_3Sn$ IMC thickness as a function of aging time at 150° C. for an alloy according to the present disclosure and a prior art SAC305 alloy.

FIGS. 18A and 18B show a comparison between the IMC layer growth of the Example 4.6 alloy and a SAC305 alloy after aging at 150 QC for up to 1440 hours. As can be seen in these figures, both the Example 4.6 alloy and the SAC305 alloy exhibit IMC layer growth. However, the SAC305 alloy shows signs of brittleness, as shown by the presence of Kirkendall voids (for example, after aging for 720 hours). Both alloys show formation of $Cu_6Sn_5$ and $Cu_3Sn$ layers at the boundary between the solder and the copper substrate. FIG. 19 shows the total IMC thickness as a function of aging time. As shown in FIG. 19, the IMC layer for the SAC305 alloy is much thicker than for the Example 4.6 alloy. The addition of microalloys to refine the microstructure may limit diffusion, thus also limiting total IMC growth. The lower IMC thickness in the Example 4.6 alloy likely makes the Example 4.6 alloy suitable for a longer life application at elevated temperatures. FIG. 20 shows the total $Cu_3Sn$ thickness as a function of aging time. At the interface between $Cu_6Sn_5$ and Cu substrate, a new IMC layer of $Cu_3Sn$ forms for both alloys. In the Example 4.6 alloy, the addition of microalloys suppresses the growth of $Cu_3Sn$, which may limit the formation of Kirkendall voids.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A lead-free solder alloy consisting of:
   3.1 to 3.8 wt % silver;
   0.5 to 0.8 wt % copper;
   1.5 to 3.2 wt % bismuth;
   0.05 to 1.0 wt % cobalt;
   1.0 to 3.0 wt % antimony;
   0.008 wt % titanium; and
   balance tin, together with any unavoidable impurities;
   wherein the lead-free solder alloy has an undercooling temperature of from about 4.52° C. to about 8.35° C.

2. The lead-free solder alloy of claim 1, wherein the silver is present in a concentration of 3.8 wt %.

3. The lead-free solder alloy of claim 1, wherein the copper is present in a concentration of 0.8 wt %.

4. The lead-free solder alloy of claim 1, wherein the cobalt is present in a concentration of 0.05 wt %.

5. The lead-free solder alloy of claim 1, wherein the bismuth is present in a concentration of 1.5 wt %.

6. The lead-free solder alloy of claim 1, wherein the bismuth is present in a concentration of 3.0 wt %.

7. The lead-free solder alloy of claim 1, wherein the antimony is present in a concentration of 1.0 wt %.

8. The lead-free solder alloy of claim 1, wherein the antimony is present in a concentration of 1.5 wt %.

9. The lead-free solder alloy of claim 1, wherein the undercooling temperature of the lead-free solder alloy is about 4.52° C.

10. The lead-free solder alloy of claim 1, wherein the undercooling temperature of the lead-free solder alloy is about 7.49° C.

11. The lead-free solder alloy of claim 1, wherein the undercooling temperature of the lead-free solder alloy is about 8.35° C.

* * * * *

UNITED STATES PATENT AND TRADEMARK OFFICE
CERTIFICATE OF CORRECTION

| | |
|---|---|
| PATENT NO. | : 11,732,330 B2 |
| APPLICATION NO. | : 16/022345 |
| DATED | : August 22, 2023 |
| INVENTOR(S) | : Md Hasnine and Lik Wai Kho |

It is certified that error appears in the above-identified patent and that said Letters Patent is hereby corrected as shown below:

On the Title Page

Column 1, item (73):
After "Solutions" delete the ","

Signed and Sealed this
Twenty-fifth Day of June, 2024

Katherine Kelly Vidal
*Director of the United States Patent and Trademark Office*